United States Patent [19]

Ingram et al.

[11] 3,831,293
[45] Aug. 27, 1974

[54] STACKED TRAY PROCESSING AND FREEZING SYSTEM

[75] Inventors: Charles E. Ingram, Freeland; Roger J. Gendron, Bridgeport; Vern V. Cronk, Hemlock; Harry J. Keefe, Saginaw, all of Mich.

[73] Assignee: Baker Perkins Inc., Saginaw, Mich.

[22] Filed: Sept. 15, 1972

[21] Appl. No.: 289,241

[52] U.S. Cl............................ 34/236, 62/63, 62/378
[51] Int. Cl.............................................. F26b 19/00
[58] Field of Search .......... 62/380, 63, 378; 34/236

[56] References Cited
UNITED STATES PATENTS

| | | | |
|---|---|---|---|
| 2,584,628 | 2/1952 | Skillman | 62/380 X |
| 3,233,421 | 2/1966 | Pittman et al. | 62/380 X |
| 3,688,518 | 9/1972 | Goltsos | 62/380 X |
| 3,728,869 | 4/1973 | Schmidt | 62/380 X |

*Primary Examiner*—Meyer Perlin
*Assistant Examiner*—Ronald C. Capossela
*Attorney, Agent, or Firm*—Learman & McCulloch

[57] ABSTRACT

A system for processing products such as food products, and more particularly comprising apparatus for loading food products into trays and for stacking the food carrying trays in vertically nested, individual stacks. The system includes apparatus for moving the stacks through a temperature controlled anteroom into a freezing chamber and a plurality of individually operable conveyor beds in the freezing chamber are provided for selectively receiving the stacks, storing the stacks for different selected processing times, and discharging the stacks. Apparatus is provided for receiving a stack of trays from any selected conveyor bed and removing it from the freezing chamber through a temperature controlled discharge anteroom. The system also includes apparatus for unstacking the stacks of discharged, frozen food carrying trays, and apparatus for unloading the product from the trays downstream of the unstacking apparatus. The unloaded trays are cleaned and returned to the loading apparatus to be reloaded with unfrozen food products.

20 Claims, 20 Drawing Figures

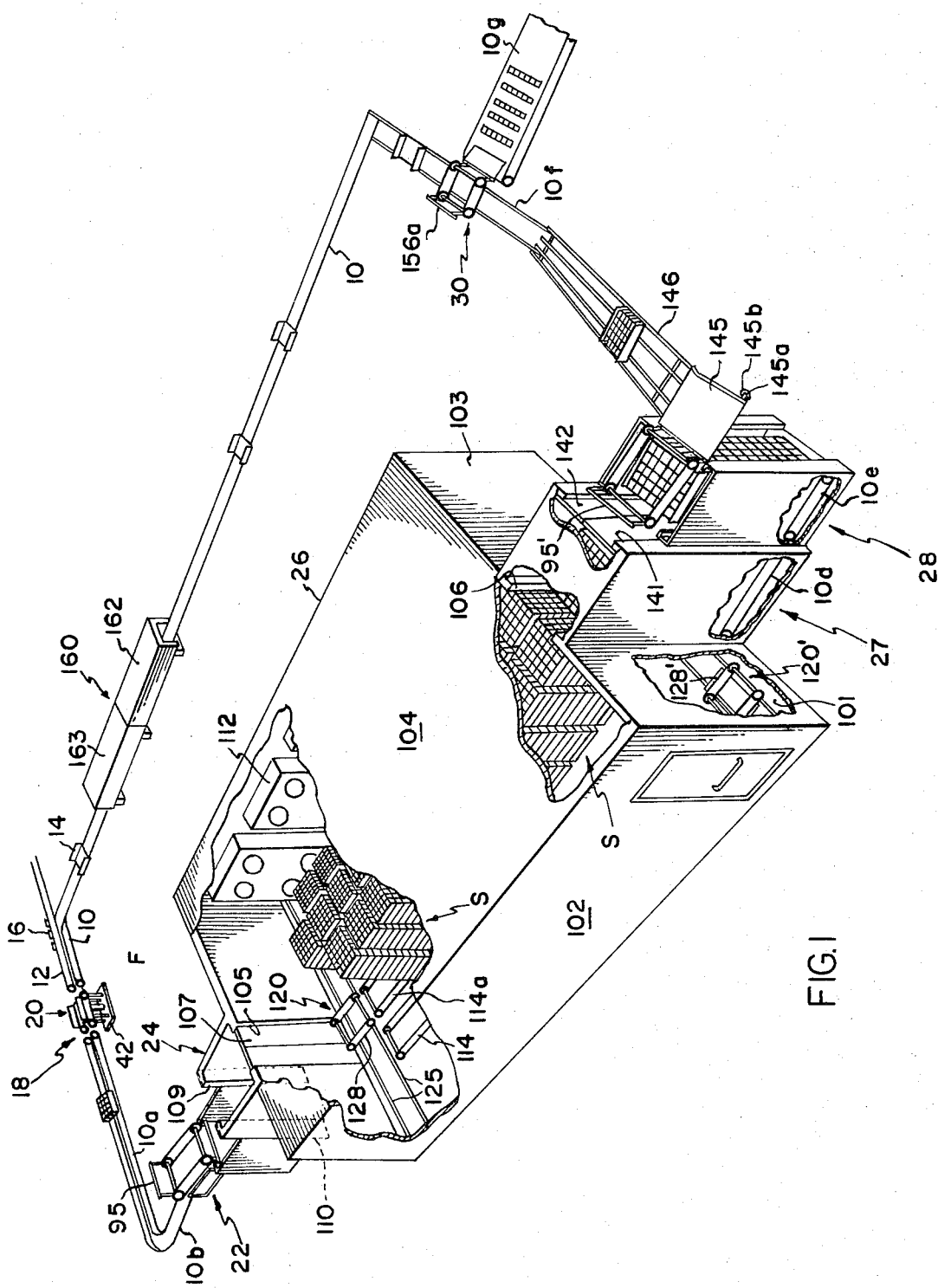

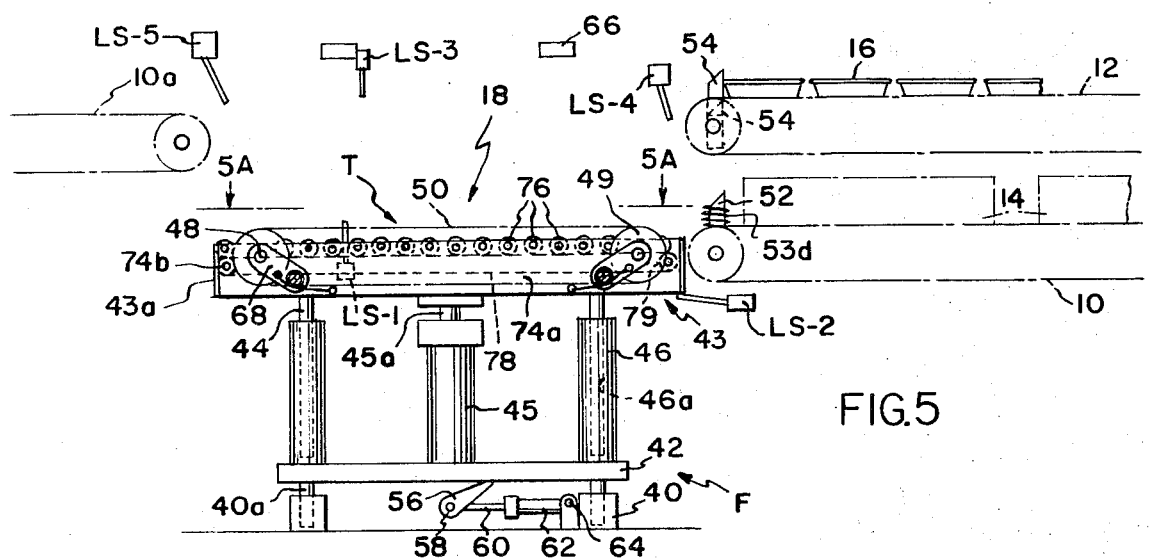

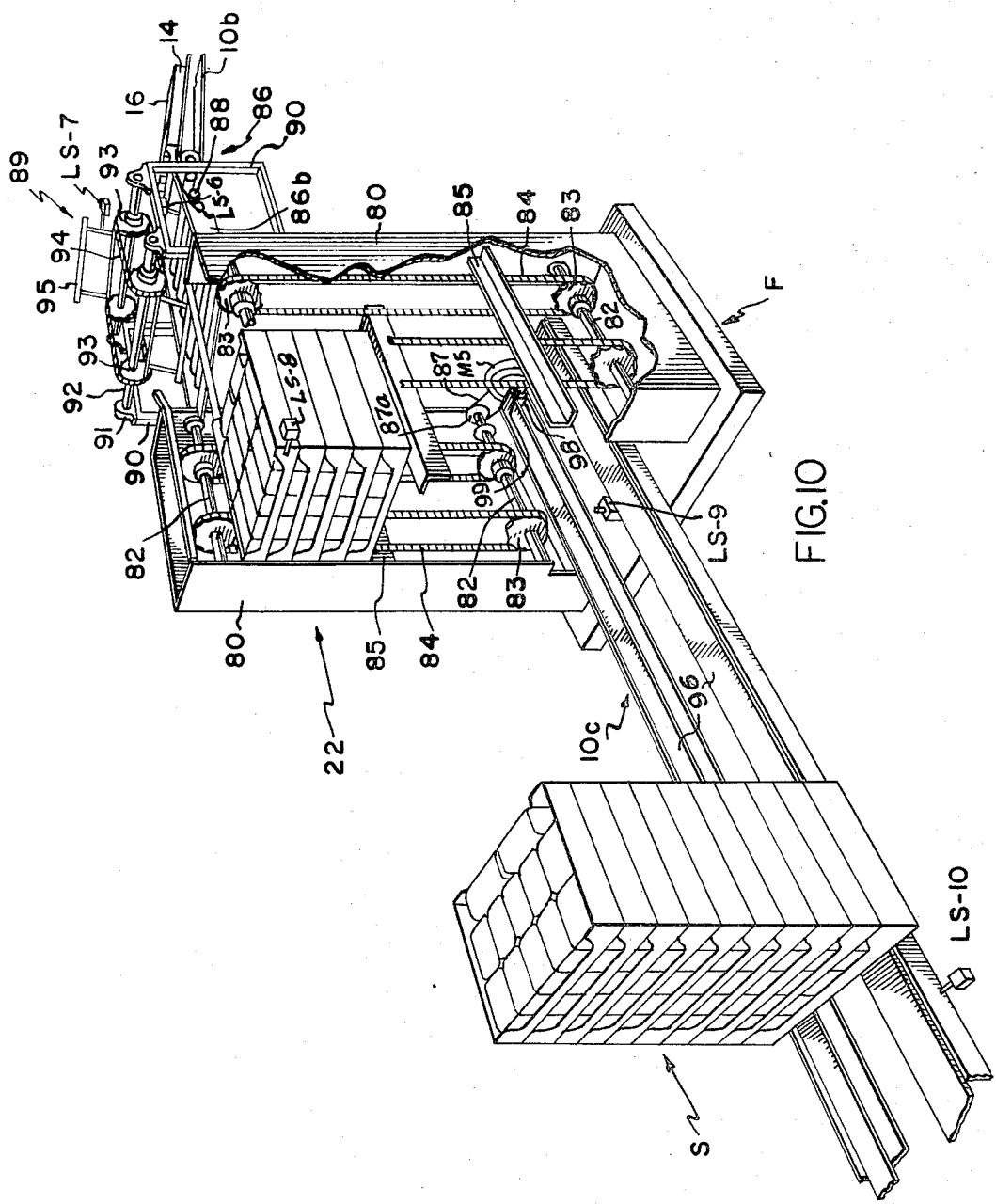

3,831,293

STACKED TRAY PROCESSING AND FREEZING SYSTEM

BACKGROUND OF THE INVENTION

This invention relates to processing systems such as production freezing systems and more particularly to apparatus for stacking, freezing, and then unstacking trays of food such as ice cream, bread dough, and poultry carcasses in a substantially continuous process.

Food freezing systems with which we are familiar have previously incorporated spiral conveyors which continuously wind throughout a freezing chamber between an inlet port and a discharge port. In order to move any one product on the spiral conveyor to or from the freezing chamber, all the products on the spiral conveyor must also be moved and this requires substantial horsepower. If "quick freeze" products are intermingled with products which require a relatively long freeze time, the "quick freeze" products cannot be removed immediately after freezing but must await their turn before being removed from the freezing chamber. This, of course, reduces the efficiency of the system and requires freezing units of substantially increased capacity. Accordingly, it is an object of the present invention to provide a production food freezing system which provides increased flexibility in permitting the simultaneous freezing of different food products for varied periods of time.

It is another object of the present invention to provide an easily expandable production freezing system which can be assembled in modules to provide a system which is flexible and will readily incorporate various processing and handling units.

It is a further object of the present invention to provide an automated and efficient food freezing system which can be used selectively as a holding freezer or a continuous production freezer.

Still another object of the present invention is to provide a food treating system having a food treating unit with a plurality of individually operable conveying beds, and apparatus for independently loading and unloading the different conveying beds within the treating unit at different rates and at different times.

Yet another object of the present invention is to provide a production treatment facility which includes stackable trays which facilitate freezing the products carried thereon and permit the side loading and unloading of product to and from the trays.

It is desirable that the stacking and unstacking of trays be accomplished outside the freezing chamber so that the mechanical parts and electrical components of the stacking and unstacking units need not be specially designed to operate in the cold environment. Accordingly, yet a further object of the present invention is to provide a food freezing system which accommodates food carrying tray stackers and unstackers, at opposite ends of a freezing unit, but outside the low temperature freeze area.

A still further object of the present invention is to provide a low cost, continuous, production freezing system of high mechanical reliability and production flexibility, having minimal maintenance and space requirements.

Another object of the present invention is to provide tray loading apparatus which moves product to a position above the bottom of the tray and then deposits the product on the tray.

Still another object of the present invention is to provide apparatus for loading a tray, with a grid bottom including product conveying members which extend through the openings to convey product to a position over the tray bottom and then move out of the openings so that the product is stripped from the product carrying members.

Other objects and advantages of the present invention will become apparent to those of ordinary skill in the art as the description thereof proceeds.

SUMMARY OF THE INVENTION

A food treating system which in the described embodiment includes mechanism for stacking food carrying trays in individual stacks and transferring the stacks to any one of a plurality of slowly moving individually operable, conveyors in a treatment enclosure, means for freezing the stacked food products on the conveyors in the treatment enclosure, means for removing a stack from any selected conveyor in the treatment enclosure and unstacking the stack of frozen products.

The present invention may more readily be understood by reference to the accompanying drawings in which:

FIG. 1 is a perspective view of a food freezing system constructed according to the present invention, the side and top walls of the freezing compartment and anterooms being broken away to illustrate the mechanism therein;

FIG. 5 is an enlarged, sectional side elevational view of tray loading apparatus constructed according to the present invention, taken along the line 5—5 of FIG. 5A;

FIG. 6 is a sectional side elevational view illustrating the tray conveyor portion of the tray loading apparatus of FIG. 5, receiving an empty tray;

FIG. 7 is a sectional side elevational view illustrating the tray loading apparatus of FIGS. 5 and 6 in a raised position in which the tray will receive food products;

FIG. 10 is an enlarged side perpsective view of tray stacking apparatus embodied in the present invention, part of the side wall of the stacking apparatus being broken away to more clearly illustrate the stack supporting mechanism;

DESCRIPTION OF THE PREFERRED EMBODIMENT

GENERAL DESCRIPTION

Figure 1A:
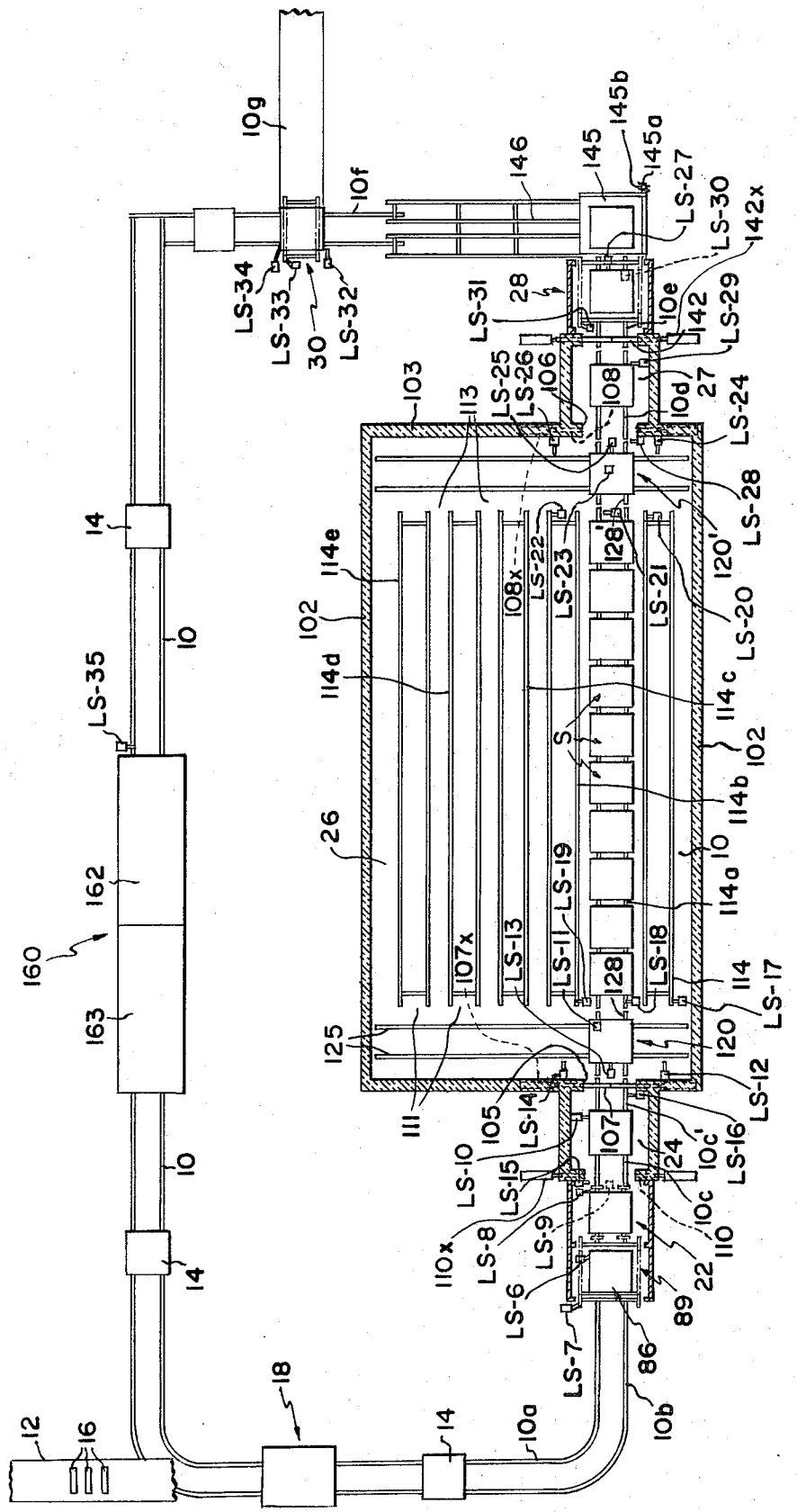
FIG. 1A is a schematic, top plan view of the food freezing system illustrated in FIG. 1.

Referring now more particularly to FIGS. 1 and 1A, the food treating system constructed according to the present invention includes supporting framework, generally designated F, mounting a tray supplying conveyor, generally designated 10, and a partially overlying product supplying conveyor, generally designated 12, which respectively supply trays or baskets, generally designated 14, and food products, such as packaged ice cream, 16 into juxtaposed relation. Tray loading apparatus, generally designated 20, receives the trays 14 and food products 16 and loads the food products 16 on the trays 14 at a tray loading station 18. The conveyors 10 and 12 may suitably comprise endless, link chain driven table top or grid conveyors of conventional construction.

Loaded trays 14 of a construction to be described are moved from the loading apparatus 20, by a conveyor section 10a which is at a slightly lower level than the product conveyor 12, to a tray stacker, generally designated 22, which stacks the product carrying trays 14 in stacks S. Endless conveyors 10c and 10c' (FIG. 1A) convey stacks S of product from the stacker 22 through a double door, temperature controlled, inlet vestibule 24 to a freezing room, generally designated 26. After the stacked products 16 are frozen in the freezing room 26, the stacks S are removed from the freezing room 26 by endless conveyors 10d and 10e through a discharge vestibule 27, and then unstacked by unstacking mechanism, generally designated 28. The unstacked trays 14 are then individually conveyed by an endless conveyor 10f to an unloading station where unloading apparatus, generally designated 30, removes the food products 16 from the trays 14. The conveyor 10f then moves the unloaded trays 14 to the conveyor 10 which, after a washing and drying operation is performed, returns the empty trays 14 to the tray loading station 18 for recycling.

THE PRODUCT SUPPORTING TRAYS

Figure 2:
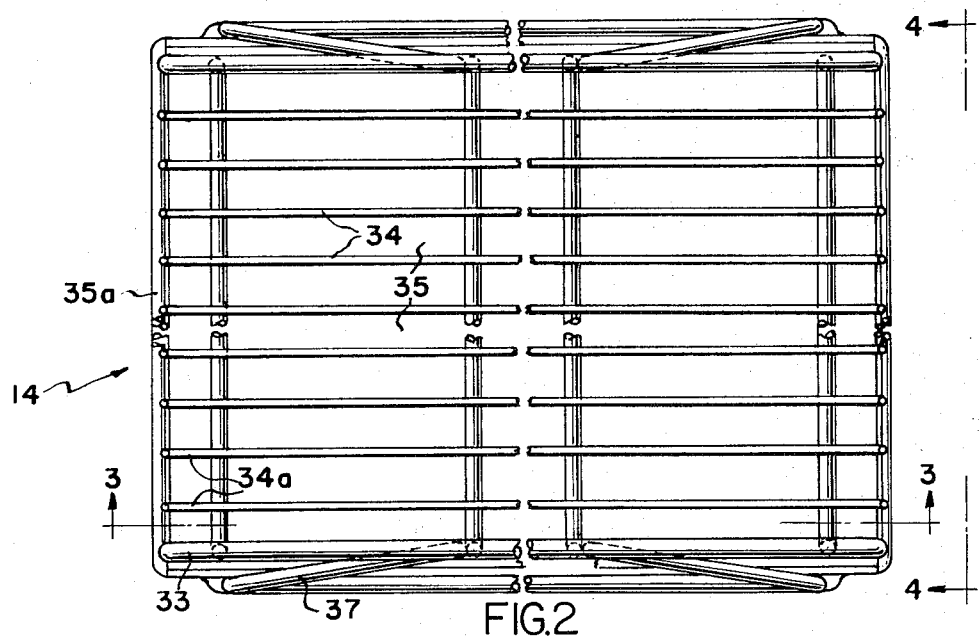
FIG. 2 is an enlarged top plan view of a stackable, food product supporting tray constructed in accordance with the present invention.
Figure 3:
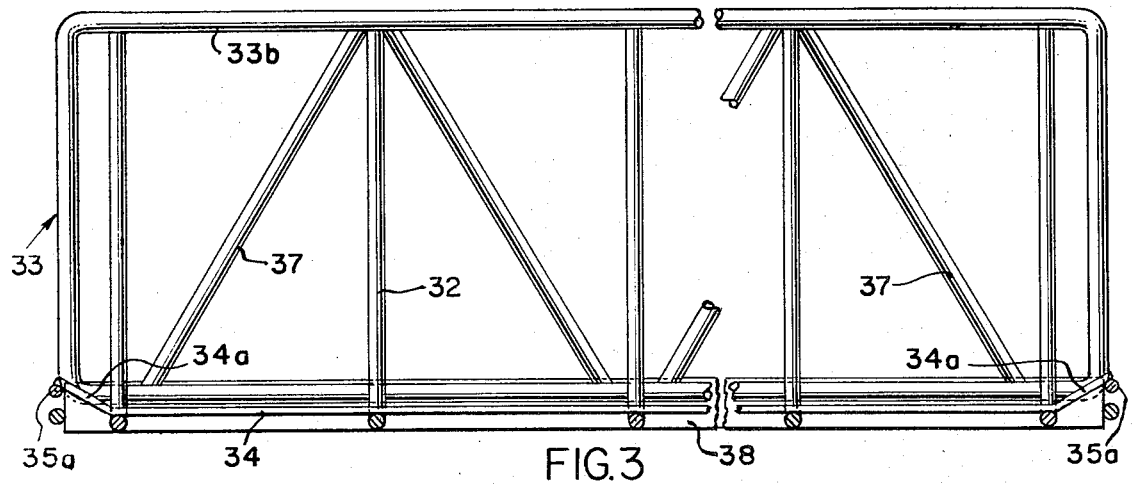
FIG. 3 is a slightly more enlarged side view of the stackable tray illustrated in FIG. 2.
Figure 4:
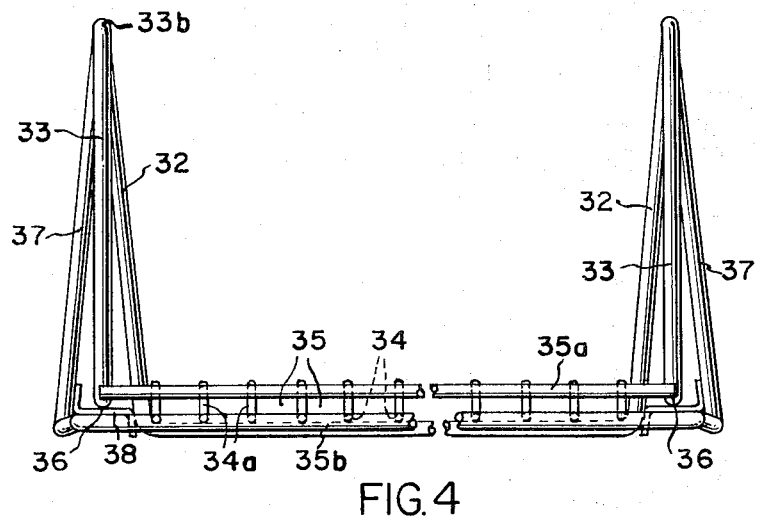
FIG. 4 is an end elevational view of the stackable tray illustrated in FIG. 2.

Referring now more particularly to FIGS. 2, 3 and 4, the product supporting open-framework trays or baskets, generally designated 14, each includes a plurality of vertical, generally U-shaped (FIG. 4) longitudinally spaced bars 32 which span the upper rail portions 33b of a pair of laterally spaced, upstanding, rectangular side frame members 33 and which support a plurality of product supporting grid members 34 defining openings 35 therebetween. The upwardly inclined front and rear ends 34a of the grip members 34 are welded to a pair of end cross bars 35a which in turn are welded at 36 (FIG. 4) to the side frame members 33. Pairs of vertically inclined, side frame reinforcing members, generally designated 37, are fixed to the upper rail portions 33b of the rectangular side frame members 33 and to a pair of end cross bars 35b spanning the reinforcing members 37. Track defining plates 38 span the lower ends of the U-shaped bars 32 and the reinforcing members 37. The plates 38 and the lower ends of the bars 32 and reinforcing members 37 cooperate to define downwardly opening sockets receiving the rail portions 33b of an underlying tray. When the trays 14 are stacked, the plates 38 slide along, and are supported by, the upper rail portions 33b of the underlying tray 14. The open grid-like construction permits the free flow of cooling air to and from the products 16.

THE LOADING APPARATUS

Referring now more particularly to FIGS. 5 - 9, the loading apparatus, generally designated 20, includes frame supported, upstanding guide cylinders 40 on which a loader support table 42 is mounted for vertical movement by vertical guide rods 40a which are fixed to the underside of the table 42 and are received in the cylinders 40. The loader-support table 42 mounts a double acting, solenoid actuated, fluid pressure operated cylinder 45 having a piston rod 45a fixed to the underside of a conveyor frame, generally designated 43. The frame 43 includes a pair of side frame members 43a (FIG. 5A) spanned by cross members 47a and 47b. Guide rods 44 are fixed to the undersides of the cross members 47a and are received in vertical guide cylinders 46 which are supported on the table 42 and have vertical passages 46a receiving the guide rods 44.

Figure 5A:
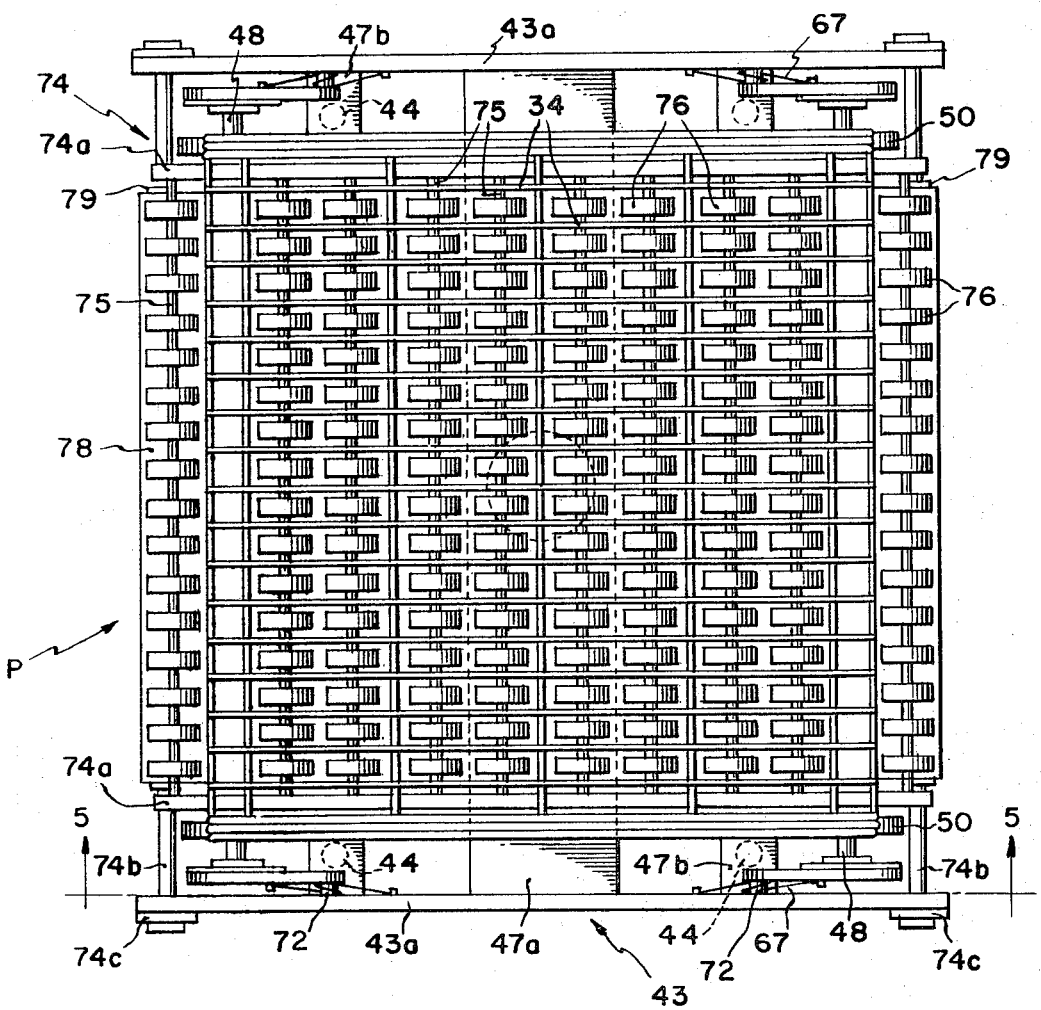
FIG. 5A is a still more enlarged top plan view of the tray loading apparatus illustrated in FIG. 5.
Figure 18:
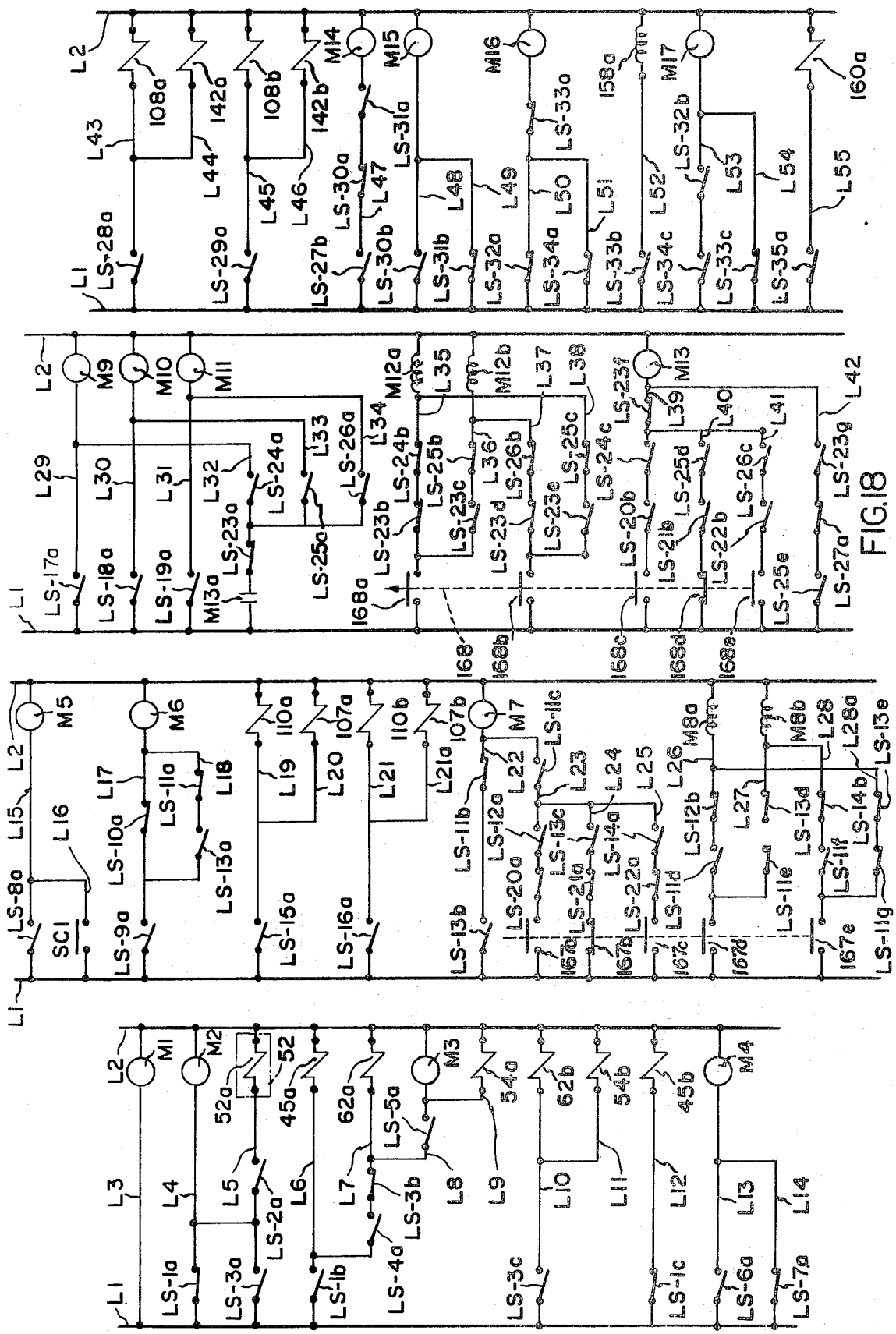
FIG. 18 is a schematic diagram of an electrical control circuit for operating the apparatus illustrated in FIGS. 1 - 17.

The conveyor frame 43 supports a tray conveyor, generally designated T, and a product conveyor, generally designated P (FIG. 5A). The tray conveyor T includes swingable, shaft support arms or links 68 fixed to stub shafts 72 journaled in the sidewalls 43a of frame 43. Stub shafts 48, journaled in the shaft support arms 68, mount drums 49 around which are trained a pair of laterally spaced apart tray conveyor belts 50 which engage only the tracks 38 of the trays 14 and convey the trays 14 to the stacking station 18. Suitable biasing means such as torsion springs 67 react between the side walls 43a and the shaft support arms 68 to normally maintain the tray conveyor T at a higher level than the product conveyor P, as illustrated in FIGS. 5 - 7. The tray conveyor belts 50 are driven by an electric motor M2 (FIG. 18). Frame supported stop members 66 (FIGS. 5 - 9) are disposed in the vertical path of a tray 14 in the raised position of the tray conveyor T illustrated in FIG. 8 for limiting the upward movement of trays thereon.

The product conveyor P comprises a subframe, generally designated 74, including side frame members 74a supported on the cross members 47a and 47b. Members 74a journal a pair of shafts 74b which are also journaled in bearings 74c on the side frame members 43a. A plurality of fixed shafts 75 span the side frame members 74a and journal a plurality of freely rotatable product supporting rollers 76 which are arranged to pass through the openings 35 in the grid bottom of a tray 14 supported on the conveyor belts 50 at the loading station 18 as will later become apparent.

A limit switch LS-1 is supported on the conveyor frame 43 in position to be actuated by a tray 14 positioned on the tray conveyor belts 50 at the loading station 18. A frame supported, tray blocking gate 52 is provided at the discharge end of tray conveyor 10 for selectively preventing and permitting the passage of trays 14 from the tray conveyor 10 to the loader tray conveyor belts 50. The tray gate 52 is normally spring biased, as by a spring 53d, to the raised position and is movable to a lowered position, when a solenoid 54a (FIG. 18) is actuated. A frame supported limit switch LS-2 in the path of the frame 43, is provided for indicating when the conveyor bed frame 43 is in its lowermost position.

Figure 8:
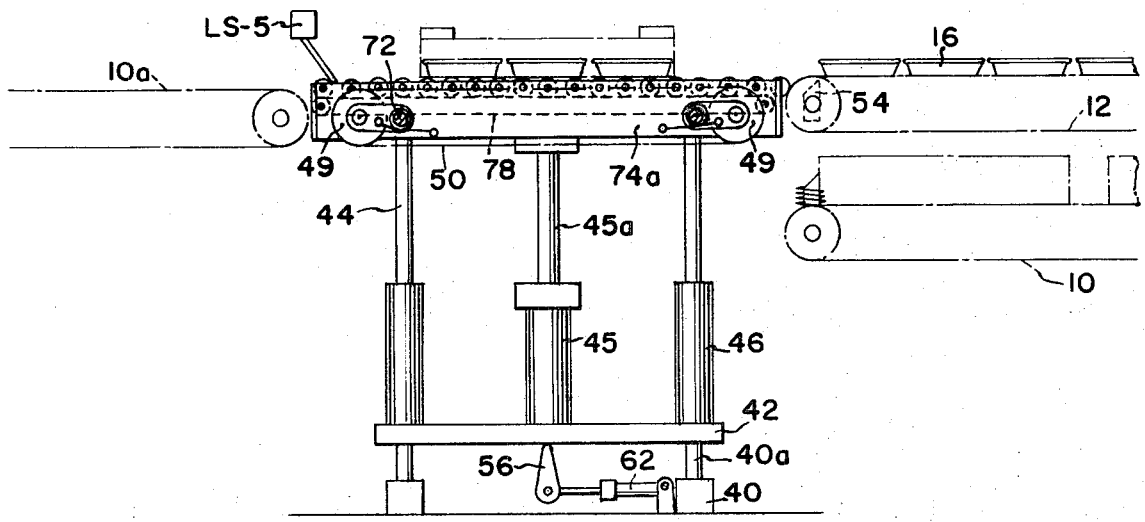
FIG. 8 is a side elevational view illustrating the product conveyor portion of the tray loading apparatus of FIGS. 5 – 7 in a raised product receiving position at a level above the tray conveyor portion of the tray loading apparatus.
Figure 9:
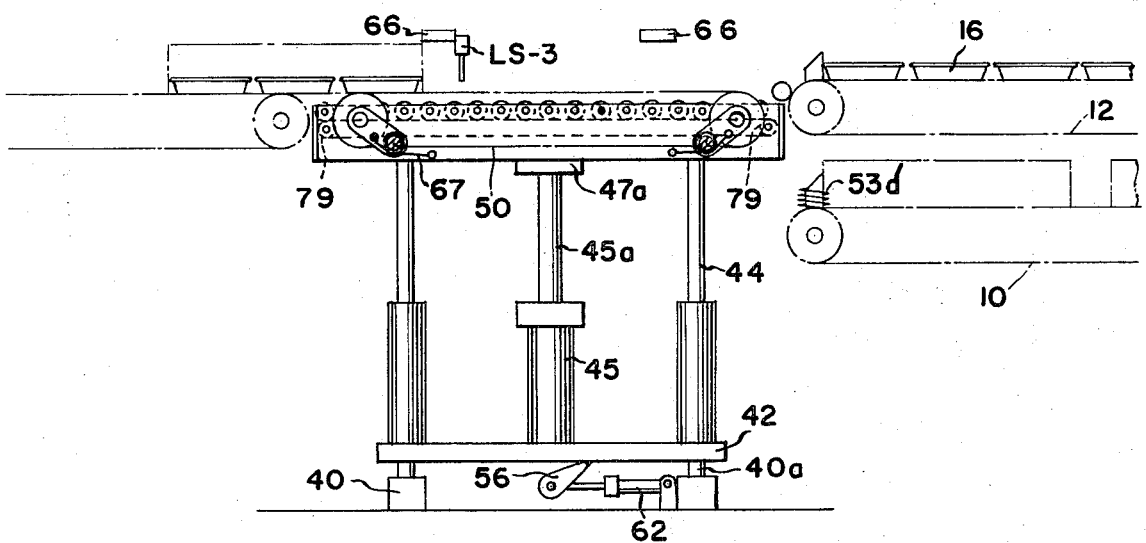
FIG. 9 is a similar side elevational view illustrating the tray conveyor portion of the tray loading apparatus discharging a loaded tray.

A product blocking gate 54 is also provided at the discharge end of the product supply conveyor 12 and is movable between the raised product blocking position, illustrated in FIG. 5, and the lowered position, illustrated in FIG. 8 by a solenoid actuated, double acting, fluid operated cylinder 54, to permit food products 16 to pass to the conveyor rollers 76 when the latter are in the raised position, illustrated in FIG. 8. A frame supported limit switch LS-5 (FIG. 8) is provided in the path of the product conveyor P for indicating when the product supporting rollers 76 are later raised to a level above the upper surface of the conveyor belts 50 so that the product blocking gate 54 can be lowered to permit products 16 to be moved onto the rollers 76.

In FIG. 7 the tray conveyor T is shown moved upwardly to a position just below stops 66. Apparatus is provided for thereafter camming the loader support table 42, the conveyor frame 43, the tray conveyor T and the product conveyor P further upwardly, to the positions illustrated in FIG. 8, and includes a table raising cam 56 fixed to a frame supported, rotatable shaft 58 rotated by the piston rod 60 of a double acting, solenoid actuated, fluid operated cylinder 62 pivoted on the frame F by a pivot pin 64. After the tray conveyor T has moved upwardly a slight distance, movement of tray conveyor T and tray 14 is interrupted by the stops 66, but the table 42, conveyor frame 43, and the product conveyor P continue to move upwardly. A frame supported limit switch LS-4 senses when the product conveyor P is in the fully raised position above tray conveyor T in which the rollers 76 can receive products. A limit switch LS-3 senses when food product 16 has been moved forwardly to a position on rollers 76 above the bottom of tray 14 and causes cylinders 62 to return cam 56, and permit the gravity lowering of the conveyor frame 43, and product conveyor P toward the positions illustrated in FIG. 7. When this happens, the tray T is held up by springs 67 and rolls 76 move downwardly through the tray bottom to deposit the food products 16 on the raised tray 14. Finally, tray conveyor T joins the other elements in moving downwardly and moves downwardly sufficiently so that the trays thereon clears stops 66. When the limit switch LS-3 is actuated, the tray conveyor drive motor M2 (FIG. 18) is also energized for discharging the loaded tray 14 from the conveyor belts 50 onto the conveyor section 10a which moves the loaded tray 14 to the stacking apparatus 22. The conveyor 10a includes a vertically inclined ramp portion 10b which elevates the loaded trays 14 to the top of the stacking apparatus 22.

THE STACKING APPARATUS

Referring now more particularly to FIG. 10, the pan stacking apparatus, generally designated 22, comprises a pair of frame supported, upstanding side walls 80, journaling laterally spaced apart pairs of upper and lower shafts 82 having sprockets 83 fixed thereto. Endless chains 84 are trained around the sprocket wheels 83 and mount a plurality of vertically spaced, stack supporting flights 85. A chain 87, driven by a motor M5, is trained around a sprocket wheel 87a fixed to one of the lower shafts 82 for driving the chains 84 to index the stack supporting flights 85 downwardly.

Adjacent the upper end of the stacking apparatus 22 is a supply conveyor, generally designated 86, receiving the trays 14 from the conveyor section 10b and including a pair of side frame members 86b journaling the supply conveyor.

Disposed above the supply conveyor is a pusher assembly, generally designated 89, including side frame members 90 mounting bearing blocks 91 which journal a pair of shafts 92. The shafts 92 have sprocket wheels 93 fixed thereto around which are trained endless chains 94. A plurality of pusher members 95 span the chains 94 and sequentially push the loaded trays 14, supported on the supply conveyor into the stacking apparatus 22 to be stacked while supported on the flights 84. A limit switch LS-6, supported on the frame 89, is actuated when a loaded tray 14 is in position to be swept into the stacker 22. A motor M4 (FIG. 18) is provided for driving one of the pusher drive shafts 92 to drive the pusher assembly 89. A limit switch LS-8 is provided on one of the stacker side walls 80, for indicating that a loaded tray 14 has been moved into the stacker 22 and energizing the lowerator motor M5 which indexes the stack support flights 85 downwardly to a position clearing the limit switch LS-8.

Extending longitudinally from the tray stacker 22 and terminating adjacent the insulated inlet vestibule 24 is the stacker discharge conveyor 10c which includes a pair of laterally spaced apart, endless conveyor belts 96 trained around frame supported rollers 98 fixed to shafts 99 driven by a suitable source of power such as an electric motor M6 (FIG. 18) A frame supported limit switch LS-9 is provided adjacent the conveyor belts 96 for indicating when a stack S is supported by the discharge conveyor 10c. A limit switch LS-15 is provided at the discharge end of the discharge conveyor 10c for a purpose to be later described.

THE FREEZER SECTION

Referring again to FIGS. 1 and 1A, the freezing room 26 includes an insulated floor 101, insulated side walls 102, insulated end walls 103 and an insulated top wall 104. An inlet opening 105 and an outlet opening 106 are provided in the opposite ends 103 of the freezer room 26 and are closed by fluid pressure cylinder operated sliding doors 107 and 108 (FIG. 1A), respectively, which are automatically opened and closed in a manner to be more particularly described hereinafter. The inlet vestibule 24 communicates with the freezer room inlet opening 105 and includes an inlet opening 109 having a pair of fluid pressure cylinder openable and closeable sliding doors 110 which are automatically opened and closed in a manner to be described more particularly hereinafter. A supply conveyor section 10c', constructed identically to the conveyor section 10c, is disposed in the inlet vestibule 24 to receive stacks S of trays 14 from the stack discharge conveyor 10c, when the vestibule doors 110 are opened, and convey them to the freezer room 26. The conveyor 10c' is coupled to the conveyor 10c by suitable drive chains so that the conveyors 10c and 10c' are concurrently driven when the motor M6 is operated.

Disposed inside the isolated, and therefor frostfree, freezer room 26 is a plurality of refrigeration blower units 112 for maintaining the required temperature therein. The refrigeration units may comprise matching fan and coil sections designed for use with either a single or a two-stage system. A limit switch LS–10 is mounted on the frame F adjacent the discharge end of the conveyor 10c' for interrupting the conveyor drive motor M6 when a stack S has been moved thereto indicating that the conveyors 10c and 10c' have a full complement of stacks S.

Figure 14:
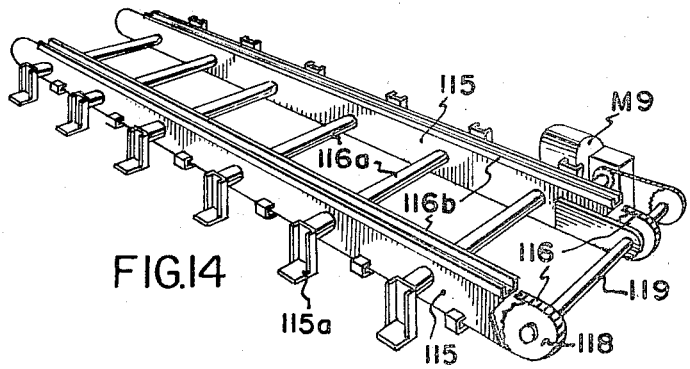
FIG. 14 is an enlarged side perspective view of one of the parallel conveyors within the freezing chamber.
Figure 15:
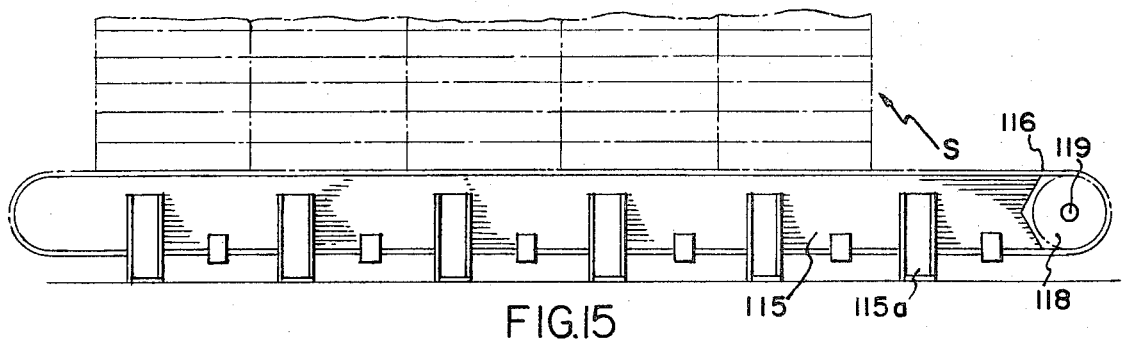
FIG. 15 is a still further enlarged, side elevational view of the conveyor illustrated in FIG. 14.

Also disposed within the freezing enclosure 26 (FIGS. 1 1A, 14 and 15) are a plurality of longitudinally extending, generally parallel, conveyor beds 114 and 114a – 114e, each including side frame members 115 (FIG. 14) supported on the freezer room floor 101 by support legs 115a. The members 115 are spanned by cross members 116a. The side frame members 115 mount chain guides 116b receiving the upper runs of a pair of endless stack supporting link chins 116 trained around sprocket wheels 118 fixed on frame supported shafts 119. Each conveyor bed 114 – 114e is driven by an individual electrical motor but, for purposes of convenience, only motors M9, M10 and M11 (FIG. 18) for driving the conveyors 114, 114a and 114b respectively, have been illustrated. The conveyor chains 116 support stacks S of trays moved thereto, in a manner to be presently described, and moves them toward the discharge outlet 106. The individually operated conveyors 114 – 114e provide flexibility in the freezing operation by permitting different products to remain in the freezer room for different lengths of time. Conveyor speeds will be in the range of 1 foot per minute, and thus wear on the conveyor chains 116 is negligible.

Figure 12:
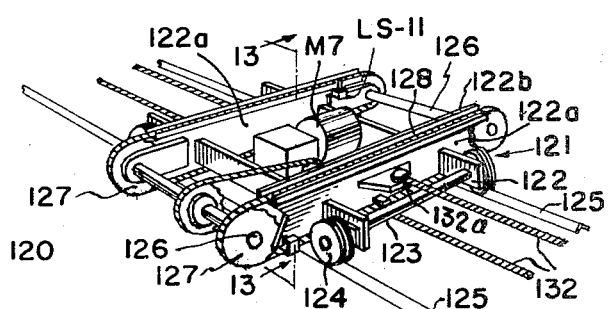
FIG. 12 is an enlarged front perspective view of the transfer conveyor illustrated in FIG. 11.
Figure 11:
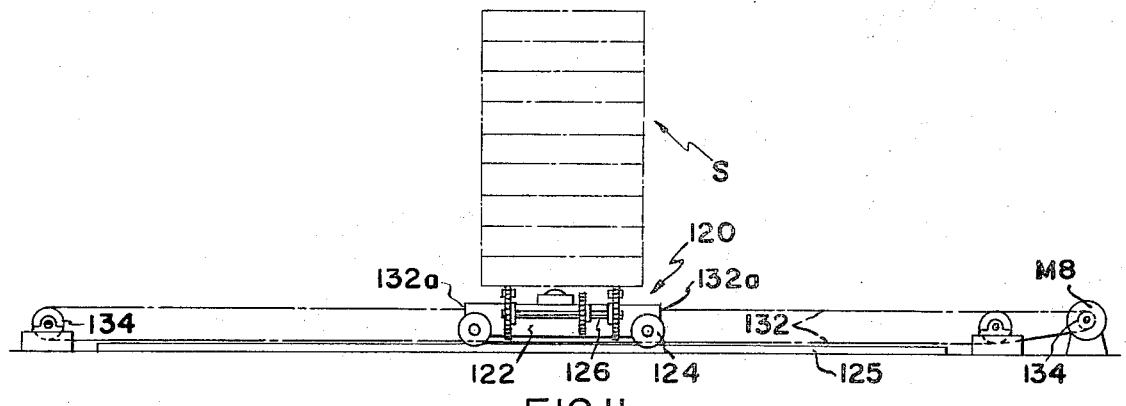
FIG. 11 is an enlarged end elevational view, taken along the line 11—11 of FIG. 1A, illustrating a transversely movable transfer conveyor incorporated in the freezing chamber for delivering stacks to the longitudinal conveyors within the freezing chamber.

Apparatus is provided for moving the stacks S of loaded trays from the freezer inlet opening 105 to the conveyor beds 114 – 114b and comprises an inlet transfer conveyor or "patrolling pallet," generally designated 120 (FIGS. 11 – 13), including a carriage 121 having frame members 122 journaling shafts 123 which support peripherally grooved wheels 124 riding on a pair of frame supported tracks 125. The carriage frame members 122 support longitudinal frame members 122a, journaling a pair of shafts 126 which supports sprocket wheels 127, having endless roller chain members 128 trained therearound. One of the shafts 126 is intermittently driven by a motor M7 (line L22, FIG. 18) which travels with carriage 121. The carriage 121 is transversely movable from a position in which the chain members 128 are aligned with the conveyor 10c' to receive a stack S to positions in which the chain members 128 are in alignment with the supply end 111 (FIG. 1A) of any of the conveyors 114 – 114b. A reversible electric motor M8 (FIG. 11 and line L26, FIG. 18) is provided for driving one of a pair of sprocket wheels 134 to transversely move the carriage 121. A drive chain 132 is trained around the sprocket wheels 134 and has its ends 132a fixed to opposite sides of the carriage 120 to move the carriage 120 in a to-and-fro path of travel on the tracks 125. A limit switch LS–11 is supported on the carriage 120 to signal when a stack has been moved thereto.

Figure 13:
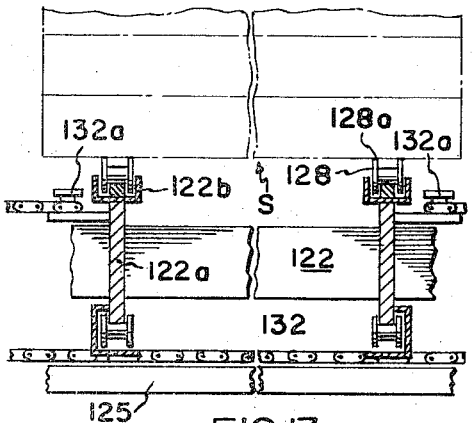
FIG. 13 is a still further enlarged, end elevational view of the transfer conveyor, taken along the line 13—13 of FIG. 12.

As viewed in FIG. 13, the carriage frame portions 122a support chain guides 122b in which the upper runs of the pair of endless roller chains 128, trained around the sprocket wheels 127, ride. A stack S to be transferred is supported on the upper surface 128a of the roller chains 128.

Provided adjacent the discharge end 113 of each of the conveyors 114 – 114e is a discharge transfer conveyor or patrolling pallet, generally designated 120', constructed identically to the patrolling pallet 120, and identical parts will be identified with identical numerals followed by a prime designation. The limit switch LS–23 and drive motor M13 on the discharge pallet 120' correspond to the limit switch LS–11 and drive motor M7 on the patrolling pallet 120. The patrolling pallet 120' is movable between positions in which the pallet 120' is in alignment with the discharge end 113 of each of the conveyors 114 – 114e to receive stacks of tray supported frozen products discharged by the conveyors 114 – 114e, and a position in alignment with the discharge opening 106 in the freezer room 26 to discharge stacks S through the opening 106 to the discharge vestibule 27.

The anteroom or discharge vestibule 27 communicates with the outlet opening 106 in the freezer room 26 and includes an outlet opening 141 having a pair of fluid pressure cylinder operated openable and closeable sliding doors 142 which are opened and closed in a manner to be described more fully hereinafter. A continuously driven, endless conveyor 10d, identical to the conveyor 10c, is provided in the discharge vestibule 27 for receiving stacks S of treated product from the patrolling pallet 120' when the freezer discharge doors 108 are opened and the vestibule outlet doors 142 are closed. The conveyor 10d is operable to convey the stacks S of treated products to the continuously driven unstacker conveyor 10e, in longitudinal alignment therewith, when the discharge vestibule doors 142 are open and the freezer outlet doors 108 are closed. The conveyor 10e delivers the stacks S of treated products 14 to the unstacking apparatus 28.

Contrary to the prior art, spiral conveyor system, in which all of the products being treated must be moved concurrently, if any products are to be moved, to thus place the entire conveying system under great strain, only the particular conveyor chains 114 – 114e undergoing movement are under tension in the present system. This system easily accommodates additional conveyor beds and gives the user more flexibility than is available with known freezer systems.

THE UNSTACKING APPARATUS

Figure 16:
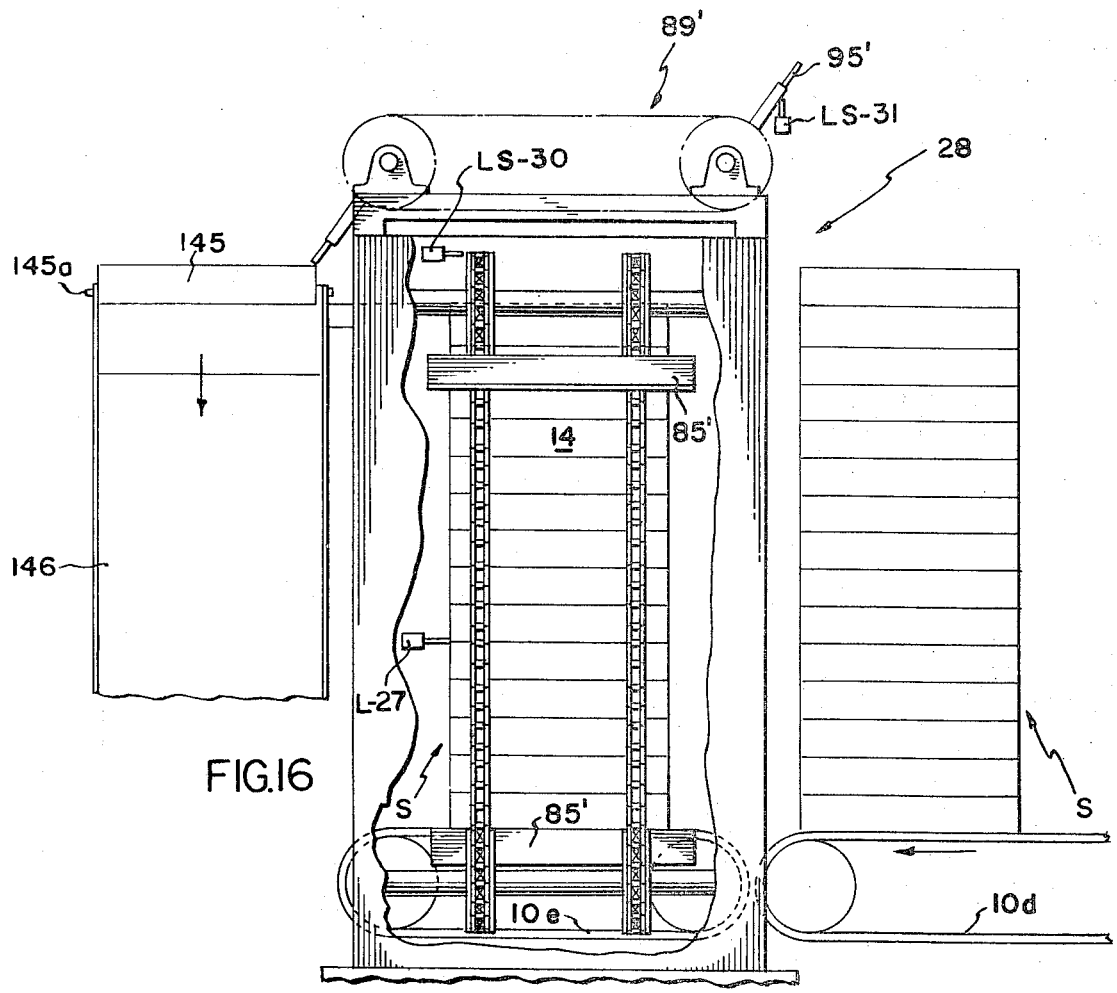
FIG. 16 is an enlarged side elevational view of the apparatus for unstacking the trays of frozen product downstream of the freezing chamber, part of the side wall of the unstacking apparatus being broken away to more clearly illustrate the stack raising mechanism.

Referring now more particularly to FIGS. 1, 1A, and 16, the unstacking apparatus 28 is constructed generally identically to the stacking apparatus 24 and identical parts will be designated by identical reference characters followed by prime designations, in the following description. The unstacking apparatus 28 differs in that the pusher assembly 89' is positioned immediately above the stack S and limit switches LS–31, LS–30, and LS–27 are substituted for the limit switches LS–7, LS–8 and LS–9 forming a part of the stacking apparatus 22. The endless conveyor section 10e, which is constructed identically to the conveyor 10c, receives the stack of trays from the vestibule conveyor 10d and conveys them forwardly to a position to be unstacked by the unstacker 28. The stack supporting flights 85' are driven upwardly and the pusher assembly 89' sequentially pushes the uppermost trays 14 from the stack S onto a tilt tray 145 (FIG. 1). The tilt tray 145 is pivotally mounted on a frame supported pivot pin 145a for swinging movement between a raised position, illustrated in FIG. 1, and a lowered, inclined position in which it discharges the trays 14 to a vertically inclined discharge conveyor chute 146. Elements such as torsion springs 145b may be provided on the shaft 145a to normally bias the tray 145 to the FIG. 1 position. The trays 14 are now reoriented 90° relative to their former orientation on the conveyor transporting them so that the open sides of the trays are at the sides of the chute 146. The chute 146 delivers the products to an endless conveyor 10f driven by an electric motor M16 (line L49, FIG. 18).

THE UNLOADING APPARATUS

The unloading apparatus, generally designated 30 (FIGS. 1 and 17), comprises a pair of upstanding frame members 148 supporting laterally extending rails 149 reinforced by braces 149a. The rails 149 support bearings 150, journaling shafts 151 which have sprocket wheels 152 fixed thereto. A pair of endless pusher chain members 54 are trained around the sprocket wheels 152 and mount members 156 spanned by pusher bars 156a which engage the frozen food products 16 and push them from the baskets 14 at the unloading station, when the pusher chains 54 are driven. The pusher chains 54 are driven by a chain 155, trained around a sprocket wheel 153a fixed to one of the shafts 151, and a sprocket wheel 153b fixed to the output shaft of a speed reduction unit U which is driven by a frame supported electric motor M17.

A tray stop member 157 is provided, and is movable into the path of a tray 14 by means of a solenoid actuated, spring returned, fluid pressure operated cylinder 158. The discharged food products 16 slide down a chute h to a continuously driven, endless conveyor 10g which conveys the food product 16 to the next handling station. When the tray 14 is unloaded, the tray stop 157 is withdrawn, and the conveyor drive motor M16 is again energized to move the conveyor 10f and the empty tray 14 to the conveyor 10. When the trays are transferred to the conveyor 10, they are once again reoriented 90° to return to their original orientation. The conveyor 10 passes through a sanitizing tunnel, schematically illustrated at 160, where the trays 14 are sanitized by a conventional washer spray unit 162 and a blower drier unit 163 and then returned to the loading station 18 for recycling.

The freeze time for each row 114 – 114e is adjustable and it can be varied as desired to match the product requirements. The discharge from the freezing chamber may be accomplished at a faster rate than the stacks are supplied to it, and many different products can be handled simultaneously.

A stack freezing system constructed according to the present invention handles a wide range of product including containers, boxes, bags, and foils for various products such as, for example, pizza, poultry parts or whole birds, meat portions and fish sticks. The system minimizes labor and maximizes efficiency, and is mechanically reliable. Moreover, it can be installed at a lower initial cost than present systems and requires minimum floor space. The system is also versatile enough to, with minor adjustment, accommodate stacks of different heights, and different height trays. Because the trays are sanitized before being reloaded with product, the system is sanitary. The double-door vestibule construction effectively eliminates frost in the freezer.

THE CONTROL CIRCUIT

Referring now more particularly to FIG. 18, a control circuit for operating the apparatus, shown in FIGS. 1 – 17, is illustrated and comprises a pair of circuit lines L1 and L2 connected across a suitable source of electrical power such as 110 volt, 60 cycle, alternating current. To assist in identifying the various components, the circuits and sub-circuits connected across the lines L1 and L2 are designated L3 through L55. The motor for concurrently and continuously driving the tray conveyors 10, 10a, 10d, and 10e and the product supplying conveyor 12 is shown generally at M1 connected in line L3 across the lines L1 and L2. Movement of the trays 14 and product 16 on the continuously driven conveyors 10 and 12 is interrupted by the tray blocking stop 52 and product blocking stop 54, respectively, as illustrated in FIG. 7. Connected in line L4 across the lines L1 and L2 is a set of normally closed limit switch contacts LS–1a which are actuated when the limit switch LS–1, mounted on the conveyor bed 43 (FIG. 5), is actuated by a tray 14 positioned at the loading station 18 on the tray conveyor belts 50. An electric motor M2, for driving the loader tray conveyor belts 50, is connected in series with the contaxts LS–1a in line L4. Connected in parallel with the contacts LS–1a is a set of normally open, limit switch contacts LS–3a (line L5), which are closed when the frame supported limit switch LS–3 (FIGS. 5 – 9) is actuated by product 16 being moved to a position overlying the bottom of tray 14 supported on the tray conveyor belts 50. Connected in parallel with the loader tray conveyor motor M2 is a circuit (line L5) including a set of normally open limit switch contacts LS–2a, which are closed when the conveyor bed 43 is in the lowered position illustrated in FIGS. 5 and 6 to actuate the frame supported limit switch LS–2. Also connected in line L5 is the tray gate lowering solenoid 52a for lowering the spring returned, tray blocking gate 52 to permit the trays 14 to move forwardly onto the tray conveyor belts 50.

Serially connected in line L6, across the lines L1 and L2, are a set of normally open limit switch contacts LS–1b, which close when the limit switch LS–1 is actuated by a tray being moved onto the tray conveyor belts 50, and a solenoid 45a for directing fluid to the loading conveyor elevating cylinder 45 in such a direction as to raise the loader bed frame 43 to the position illustrated in FIG. 7 so that a tray 14 is positioned a slight clearance distance below the stops 66. Connected in parallel with the loader bed elevating solenoid 45a is a line L7 including a set of normally closed, limit switch contacts LS–3b (line L7), which open when the product 16 is moved to a position overlying the bottom of a tray 14 to actuate the limit switch LS–3. Also connected in line L7 are the normally open limit switch contacts LS–4a, which are closed when the conveyor bed frame 43 is moved upwardly to the raised position (FIG. 7) to actuate the limit switch LS–4. Connected in series with the limit switch contacts LS–4 and LS–3 is the product conveyor elevating solenoid 62a, which causes fluid to be supplied to the cylinder 62 in such a direction as to move the loader support frame 43, the tray conveyor T, and the loader support table 42 from the positions, illustrated in FIG. 7, to the raised positions, illustrated in FIG. 8. When the frame 43 is moved upwardly a short distance, the tray 14 engages the stops 66 to interrupt upward movement of the tray conveyor T. Continued upward movement of the conveyor frame 43 moves the product conveyor P upwardly, however, relative to the tray conveyor T so that the product conveyor P is at a higher level than the tray conveyor T, thus permitting the product 16 released by the product stop 54 to be moved by the product rollers 76 to a position superposed with the bottom of the tray 14.

Connected in line L7, in parallel with the product raising solenoid 62a, is a set of normally open limit switch contacts LS–5a, which close when the limit switch LS–5 is actuated by the product support rollers 76 being moved upwardly to a level higher than the tray conveyor T. Also provided in line L8 is the motor M3 for driving the belt 78 which drives product conveying rollers 76. Connected in parallel with the roller driving motor M3 is a product gate lowering solenoid 54a (line L9) which moves the product blocking gate 54 from the raised position, illustrated in FIG. 5, to the lowered position, illustrated in FIG. 8, to permit products 16 to be moved from the product supplying conveyor 12 to the product conveyor P.

Connected in line L10, across the lines L1 and L2, is a set of normally open limit switch contacts LS–3c, which close when the limit switch LS–3 is actuated by product 16 moving into superposed relation with the bottom wall of the tray 14, and a product conveyor lowering solenoid 62b which actuates the cylinder 62 in such manner as to move the cam 56 from the position illustrated in FIG. 8 to the position shown in FIG. 7. This permits the effect of gravity to lower the product conveyor rollers 76 through the bottom wall of the tray 14 to positions below the upper surface of the conveyor 50. Connected in parallel with the product conveyor lowering solenoid 62b is the product gate raising solenoid 54b (line L11) which is simultaneously energized to cause operating fluid to be directed to the cylinder 54' in such a manner as to raise the product gate 54 to the product blocking position, preventing products 16 from moving forwardly onto the product conveyor P.

Connected in line L12, across the lines L1 and L2, is a set of normally closed limit switch contacts LS–1c, which open when a tray 14 is moved onto the loader 20 to actuate the limit switch LS–1, and a loader bed lowering solenoid 45b, which causes operating fluid to be directed to the conveyor elevating cylinder 45 in such a manner as to lower the conveyor bed frame 43 from the position illustrated in FIG. 7, after the product filled tray has been discharged, to the lowered position illustrated in FIGS. 5 and 6.

Connected across the lines L1 and L2, in line L13, is a set of normally open limit switch contacts LS–6a, which close when the limit switch LS–6 (FIG. 10) is actuated by a tray 14 that is on the stacker supply convor 86, and the stacker sweep motor M4 for driving the sweep 89 to sweep trays 14 from the conveyor 86 into the stacker 22. Connected in parallel with the contacts LS–6a are the normally closed limit switch contacts LS–7a (line L14) which are opened when one of the stacker sweep bar 95 is in the "home" or start position to actuate a frame supported limit switch LS–7 (FIG. 10).

Connected in line L15 across the lines L1 and L2 are the normally open limit switch contacts LS–8a, which are closed when a tray is moved into the stacker 22 to actuate the frame supported limit switch LS–8 (FIG. 10), and a stacker lowerator drive motor M5 for downwardly indexing the stack supporting flights 85 in incremental steps. A cam operated switch SC–1 (line L16), closed by a cam (not shown), which is driven by one of the stacker shafts 82, is connected in parallel with the contacts LS–8a to energize the stacker lowerator motor M5 after a full stack S has been supplied to the stacker 22 to lower the stack S onto the discharge conveyor 10c.

Connected in line L17, across the lines L1 and L2, are the normally open limit switch contacts LS–9a, which close when the stack S has been moved to the discharge conveyor 10c to actuate the limit switch LS–9 (FIG. 10), the normally closed limit switch contacts LS–10a, which are opened when the stack S has been moved to the discharge end of the discharge conveyor 10c' to actuate the limit switch LS–10 (FIG. 10), and a stacker discharge conveyor drive motor M6 which, when energized, concurrently drives the conveyors 10c and 10c'.

Connected in line L18, in parallel with the contacts LS–10a, is a series circuit including a set of normally closed limit switch contacts LS–11a, which close when a stack S is on the transfer feed conveyor, or patrolling pallet, 120 to actuate the carriage supported limit switch LS–11 (FIG. 12), and the normally open limit switch contacts LS–13a, which close when the transfer feed conveyor 120 is aligned with the freezer inlet opening 105 and second freezer transfer conveyor lane 114a to actuate a limit switch LS–13 (FIG. 1A).

Connected in line L19, across the lines L1 and L2 are the normally open limit switch contacts LS–15a which close when a limit switch LS–15, located at the discharge end of the conveyor 10c adjacent the vestibule entry doors 110, is actuated by a stack moving toward the vestibule entry doors 110. Connected in series with the limit switch contacts LS–15a is a solenoid 110a for causing the vestibule inlet doors 110 to open via double acting, solenoid actuated fluid pressure cylinders 110x. Connected in parallel with the solenoid 110a is in inlet door closing solenoid 107a (line L20) which is simultaneously energized, to cause the freezing chamber inlet doors 107 to close via similar cylinders 107x.

Connected across the lines L1 and L2, is a line L21 including the noramlly open limit switch contacts LS–16a which close when a limit switch LS–16 (FIG. 1A) is actuated by a stack S on the conveyor 10c' adjacent the freezer inlet doors 107. Connected in series with the limit switch contacts LS–16a is a solenoid 110b which causes the vestibule inlet doors 110 to close via the power cylinders 110x mentioned. Connected in parallel with the solenoid 110b is a door opening solenoid 107b (line L21a) which is simultaneously energized to cause the freezer inlet doors 107 to open via the previously mentioned power cylinders 107x and permits a stack S on the conveyor 10c' to be moved into the freezing room 26.

Connected in line L22, across the line L1 and L2, is a set of normally open limit switch contacts LS–13b, which close when the patrolling pallet 120 is in alignment with the second conveyor lane 114a, the limit switch contacts LS–11b, which open when the limit switch LS–11 is actuated by a stack S on the feed conveyor chains 128 of the patrolling pallet 120, and the entry transfer feed conveyor motor M7 for driving the transfer conveyor chains 128.

A three-position, manually operable, load selector switch, generally designated 167, is provided and includes sets of contacts 167a (line L23), 167b (line L24, and 167c (line L25). In the first position of the selector switch 167, the contacts 167b are closed and the contacts 167a and 167c are open. In the second position of the switch 167, the contacts 167a are closed and the contacts 167b and 167c are open. In the third position of the switch 167, the contacts 167c are closed and the contacts 167a and 167b are open.

Connected in parallel with the limit switch contacts LS–13b and the limit switch contacts LS–11b (line L22) is a line L23. Connected in line L23 are the selector switch contacts 167a and the normally closed limit switch contacts LS–20a which are opened when the first conveyor lane 114 is supplied with a full complement of stacks S to actuate a limit switch LS–20 at the discharge end 113 of the conveyor 114. Also connected in line L23 are the normally open limit switch contacts LS–12a, which are closed when the patrolling pallet 120 is moved to a position in alignment with the supply end 111 of first conveyor bed 114 to actuate a limit switch LS–12 (FIG. 1A) supported at the supply end of the conveyor bed 114. Connected in series with the switches 167a, LS–20a and LS–12a are the normally open limit switch contacts LS–11c, which close when a stack S is conveyed to the transfer conveyor 120 to actuate the limit switch LS–11.

Connected in parallel with the switches 167a, LS–20a, and LS–12a are a pair of lines L24 and L25. Serially connected in line L24 are the contacts 167b of the switch 167, and the normally closed limit switch contacts LS–21a, which are opened when the second lane 114a is supplied with a full complement of stacks S to actuate a limit switch LS–21 at the discharge end of the conveyor 114a. Also connected in line L24 are the normally open limit switch contacts LS–13c, which are closed when the patrolling pallet or transfer feed conveyor 120 is in alignment with the second freezer conveyor 114a.

Serially connected in line L25 are the selector switch contacts 167c, the normally closed limit switch contacts LS–22a, which are opened when the third freezer conveyor 114b is supplied with a full complement of stacks S to actuate the limit switch LS–22 at the discharge end of the third freezer lane 114b. Also connected in line L25 are the normally open limit switch contacts LS–14a which are closed when the transfer carriage or patrolling pallet 120 is moved to a transfer position in alignment with the third freezer conveyor 114b to actuate the limit switch LS–14 (FIG. 1A).

The selector switch 167 also includes contacts 167d (line L26) and 167e (line L28). The contacts 167d close when the contacts 167a close to supply a stack S to conveyor 114. Also, the contacts 167e close when the contacts 167c close, to supply a stack S to the third freezer conveyor 114b. When a stack S is to be supplied to the second freezer conveyor 114a, the contacts 167d and 167e are both open.

Serially connected in line L26 are the selector switch contacts 167d, the normally open limit switch contacts LS–11d, which open when a stack S is supplied to the patrolling pallet 120 to actuate the limit switch LS–11, the normally closed limit switch contacts LS–12b, which open when the patrolling pallet 120 is moved into alignment with the first freezer conveyor 114, and the advance armature winding M8a of the patrolling pallet lateral traversing motor M8.

For driving the patrolling pallet lateral traversing motor M8 in reverse, a circuit line L27 is connected between the junction of the contacts 167d and the limit switch contacts LS–11d (line L26), and the line L2. Connected in the line L27 are a set of normally closed limit switch contacts LS–11e, which open when the limit switch LS–11 is actuated as the patrolling pallet 120 is loaded, the normally closed limit switch contacts LS–13d, which are opened when the patrolling pallet 120 returns to the position in alignment with the freezer room inlet opening 105, and the reverse winding M8b of the motor M8 for driving the motor M8 in the reverse direction.

For driving the motor M8 so that the carriage will be moved to the third freezer conveyor 114b, a line L28 is connected between the line L1 and the armature winding M8b. Connected in line L28 are selector switch contacts 167e, the normally open limit switch contacts LS–11f, which close when the patrolling pallet 120 is loaded, and normally closed limit switch contacts LS–14b, which open when the patrolling pallet 120 moves to a position in alignment with the third freezer conveyor 114b to actuate the limit switch LS–14.

To return the patrolling pallet 120 from a position in alignment with the third freezer conveyor 114b to a central position aligned with the freezer conveyor 114a, a line L28a is provided and is connected between the junction of the contacts 167e and LS–11f (line L28) and the advance winding M8a (line L26). Connected in line L28a are a set of normally closed limit switch contacts LS–11g, which open when the patrolling pallet 120 is loaded, and a set of normally closed limit switch contacts LS–13e which open when the patrolling pallet 120 is returned to the position in line with the freezer inlet port 105 and the conveyor lane 114a. Connected in the lines L29, L30 and L31 are the freezer motors M9, M10 and M11 respectively for driving the freezer conveyors 114, 114a and 114b respectively. The motor M9 is connected in series in line L29 with the normally open limit switch contacts LS–17a which are closed when the patrolling pallet conveyor chains 128 are driven to move a stack to the freezer conveyor lane 114. The stack moved actuates a limit switch LS–17 (FIG. 1A), supported on the supply end of freezer conveyor 114. Connected in line L30 is the motor M10, for driving the second freezer conveyor 114a, and the limit switch contacts LS–18a which close when the patrolling pallet conveyor chains 128 are driven to move a stack S to the freezer conveyor 114a. The stack moved actuates a limit switch LS–18, supported on the supply end of the conveyor 114 (FIG.

1A). Connected serially in line L31 is the motor M11 for driving the third freezer conveyor 114b and the normally open limit switch contacts LS–19a which close when a stack S is being delivered from the patrolling pallet 120 to the third freezer conveyor 114b and actuates the limit switch LS–19 (FIG. 1A) mounted on the supply end of the conveyor 114b.

Connected in parallel with the limit switch contacts LS–17a, is a line L32 including a set of normally open contacts M13a which close when the discharge transfer feed conveyor motor M13 (line L39) is energized, the normally closed limit switch contacts LS–23a (line L32), which open when the discharge patrolling pallet 120' is loaded with a stack S which actuates a carriage supported limit switch LS–23 (FIG. 1A), and the normally open limit switch contacts LS–24a, which are closed when the discharge patrolling pallet 120' is in alignment with the discharge end 113 of the first freezer conveyor 114 to actuate the limit switch LS–24 (FIG. 1A).

Connected in line L33 between the junction of the limit switch contacts LS–23a and LS–24a (line L32) and the junction of the contacts LS–18a and the freezer conveyor drive motor M10 (line L30) are a set of normally open limit switch contacts LS–25a, which close when the discharge patrolling pallet 120' is in alignment with the discharge end 113 of the freezer conveyor 114a and the freezer outlet 106 to actuate a limit switch LS–25 (FIG. 1A) adjacent the discharge end of the freezer conveyor 114a.

Connected between the junction of the limit switch contacts LS–23a and LS–24a (line L32) and the junction of the limit switch LS–19a and freezer conveyor drive motor M11 (line L31) is a set of normally open limit switch contacts LS–26a (line L34) which close when the discharge transfer conveyor 120' is in alignment with the third freezer conveyor 114b to actuate a limit switch LS–26 (FIG. 1A) adjacent the discharge end of the third freezer conveyor 114b.

A three position, lane discharge select switch, generally designated 168, is provided and includes sets of contacts 168a (line L36) and 168b (line L38). In the first position of the switch 168, the contacts 168a and 168b are both open so that the chains 128' of the discharge patrolling pallet 120' will receive a stack S for the second conveyor lane 114b. In the second position of the switch 168, the contacts 168a are closed and the contacts 168b are open so that the chains 128' of the patrolling pallet 120' will be moved into alignment with the discharge end 113 of the first freezer conveyor 114. When the selector switch 168 is moved into its third position, the contacts 168a are opened and the contacts 168b are closed so that the chains 128' of the patrolling pallet 120' will be moved into alignment with the discharge end 113 of the third freezer conveyor 114b.

Connected in line L35 across the lines L1 and L2 are the selector switch contacts 168a, the normally closed limit switch contacts LS–23b, which open when a stack S is loaded on the discharge patrolling pallet 120' and actuates the limit switch LS–23, and the normally closed contacts LS–24b, which are opened when the discharge patrolling pallet 120' is in alignment with the first freezer conveyor 114. Also connected in line L35 is the forwarding winding M12a of the discharge carriage transfer motor M12 for laterally moving the discharge patrolling pallet 120' into alignment with the discharge end 113 of the freezer conveyor 114.

Connected between the junction of the contacts 168a and LS–23b (line L35) and the circuit line L2, is a series circuit including the normally open limit switch contacts LS–23c, which are closed when the discharge patrolling pallet 120' is loaded with a stack, which actuates the limit switch LS–23, the normally closed limit switch contacts LS–25b which are opened when the discharge patrolling pallet 120' is in alignment with the second freezer conveyor 114a and the freezer outlet opening 106, and the armature winding M12b for laterally driving the patrolling pallet 120' in the reverse direction. Also connected between the line L1 and the armature M12b is a series circuit (line L37) including the selector switch contacts 168b, the normally closed limit switch contacts LS–23d which open when a stack S is on the discharge patrolling pallet 120' and actuates the limit switch LS–23, and the normally closed contacts LS–26b, which are opened when the discharge patrolling pallet 120' is adjacent the discharge end of the third freezer conveyor lane 114b. Connected between the junction of the contacts 168b and LS–23d (line L37) and the junction of the contacts LS–24b and the motor winding M12a (line L–35), are the normally open contacts LS–23e, which are closed when a stack S is on the discharge patrolling pallet 120', and the normally closed limit switch contacts LS–25c which are open when the discharge patrolling pallet 120' is aligned with the discharge end of the second freezer conveyor 114a.

The lane selector switch 168 also includes sets of contacts 168c, 168d and 168e in lines L39, L40 and L41 respectively. When the lane selector switch 168 is in the first position to move the patrolling pallet 120' into alignment with the second freezer conveyor 114a, the switch contacts 168d are closed and the switch contacts 168c and 168e are open. When the selector switch 168 is in the second position to move the patrolling pallet 120' into alignment with the first freezer conveyor 114, the switch contacts 168c are closed and the switch contacts 168d and 168e are open. When the switch 168 is in the third position to move the discharge transfer conveyor 120' into alignment with the third freezer conveyor 114b, the switch contacts 168e are closed and the switch contacts 168c and 168d are open.

Connected in line L39 across the lines L1 and L2 are the selector switch contacts 168c, the normally open limit switch contacts LS–20b, which close when a full complement of stacks S is supplied to the first freezer conveyor 114 to actuate the limit switch LS–20, and the normally open limit switch contacts LS–24c which close when discharge patrolling pallet 120' is adjacent the discharge end of the first freezer conveyor 114. Also connected in line L39 are the normally closed limit switch contacts LS–23f, which open when the discharge transfer feed conveyor 120' is loaded, and the discharge transfer feed conveyor motor M13 for discharging stacks from the conveyor chains 128'. Circuit line L40 is connected between circuit line L1 and the junction of the limit switch contacts LS–24c and LS–23f (line L39). Serially connected in line L40 are the selector switch contacts 168d of the lane selector switch 168, the normally open limit switch contacts LS–21b, which are closed when a full complement of stacks S is supplied to the second freezer conveyor 114a and actuates the limit switch LS–21 at the discharge end of the second freezer conveyor 114a, and the normally open limit switch contacts LS–25d, which are closed when the discharge patrolling pallet 120′ is in alignment with the second freezer conveyor 114a.

Circuit line L41 is connected in parallel with the circuit line L40. Serially connected in line L41 are the selector switch contacts 168e, the normally open limit switch contacts LS–22b, which are closed when a full complement of stacks S is delivered to the third freezer conveyor 114b and actuates the limit switch LS–22 at the discharge end of the second conveyor 114a, and the normally open limit switch contacts LS–26c, which are closed when the discharge patrolling pallet 120′ is adjacent the discharge end 113 of the third freezer conveyor 114b.

Connected in circuit between the discharge conveyor transfer motor M13 (line L39) and the circuit line L1 is a series circuit including the normally open switch contacts LS–25e (line L42), which are closed when the discharge patrolling pallet 120′ is in alignment with the second freezer conveyor 114a, the normally closed limit switch contacts LS–27a, which are opened when a stack S is moved into the unstacker 28 and actuates the limit switch LS–27 (FIG. 16), and the normally open limit switch contacts LS–23g which are closed when a stack S is on the discharge patrolling pallet 120′.

Connected in circuit line L43, across the lines L1 and L2, are the normally open limit switch contacts LS–28a which are closed when a stack S is being discharged by the patrolling pallet 120′ and actuates a frame supported limit switch LS–28 positioned inside the freezer discharge doors 108. A solenoid 108a which, when energized, will cause the freezer discharge doors 108 to open, via solenoid operated, double acting, fluid pressure operated cylinders 108X, is connected in line L43. Connected in line L44, in parallel with the discharge door opening solenoid 108a, is a door closing solenoid 142a which is simultaneously energized to cause the anteroom outlet doors 142 to close via similar cylinders 142x. Connected in line L45 across the lines L1 and L2 are the normally open limit switch contacts LS–29a, which are closed when a stack S is moved into the discharge anteroom 27 and actuates a limit switch LS–29 (FIG. 1A) adjacent the vestibule outlet doors 142, and a door closing solenoid 108b which causes the freezer outlet doors 108 to close via the cylinders 108x. Connected in line L46 in parallel with the freezer door closing solenoid 108b is a vestibule door opening solenoid 142b which is simultaneously energized to cause the anteroom outlet doors 142 to open via cylinders 142x so that a stack S on the conveyor 10d may be discharged to the unstacker 28. It should be understood that the remaining freezer conveyors 114c, 114d, and 114e include similar control circuitry.

Connected in line L47, across the lines L1 and L2, are the normally open limit switch contacts LS–27b, which close when a stack S is moved into the unstacker 28, the normally closed limit switch contacts LS–30a, which are opened when a stack S is elevated to a position such that the uppermost tray 14 is in position to be unstacked and actuates a frame supported limit switch LS–30 (FIG. 16). Also connected in line L47 is a set of normally open limit switch contacts LS–31a which are closed when one of the pusher bars 95′ engages a frame supported limit switch LS–31 (FIG. 16), and the unstacker elevator motor M14 for sequentially indexing the stack S in the unstacker 28 upwardly in incremental steps.

Connected in line L48, across the lines L1 and L2, are the normally open limit switch contacts LS–30b, which are closed when a stack S is elevated to unstacking position, and an unstacker sweep motor M15 for driving the unstacker sweep 89′ to sequentially sweep the uppermost trays 14 from the stack S. Connected in line L49, in parallel with the contacts LS–30b, are the normally closed limit switch contacts LS–31b which are opened one of the unstacker pusher bars 95′ is in the "home" or start position and actuates the limit switch LS–31.

Connected in line L50, across the lines L1 and L2, are the normally closed limit switch contacts LS–32a, which are opened when an unstacked tray 14 is in position to be unloaded at the unloader 30 and product 16 is in the tray 14 to actuate a frame supported limit switch LS–32 (FIG. 14), extending into the path of the product 16. Also connected in line L50, are the normally closed limit switch contacts LS–33a, which are opened when the unloader sweep 156 completes its cycle and actuates a frame supported limit switch LS–33. Also connected in line L50, is the unloader conveyor motor M16, which is operative to drive the unloader conveyor 10f which delivers the unstacked trays 14 to the unloader 30.

Connected in parallel with the limit switch contacts LS–32a (line L49), are the normally closed limit switch contacts LS–34a (line L51), which are opened when a tray 14 is in the unload position and actuates a frame supported tray sensing limit switch LS–34 (FIG. 17) in the path of a tray 14 in the unloader. Connected in line L52, are the normally open limit switch contacts LS–33b, which are closed when one of the pusher bars 156a actuates the limit switch LS–33, and a solenoid 158a for directing fluid to the tray stop retract cylinder 158 such that it will retract the stop 157 to permit the unloaded tray 14 to proceed forwardly on the conveyor 10f.

Figure 17:
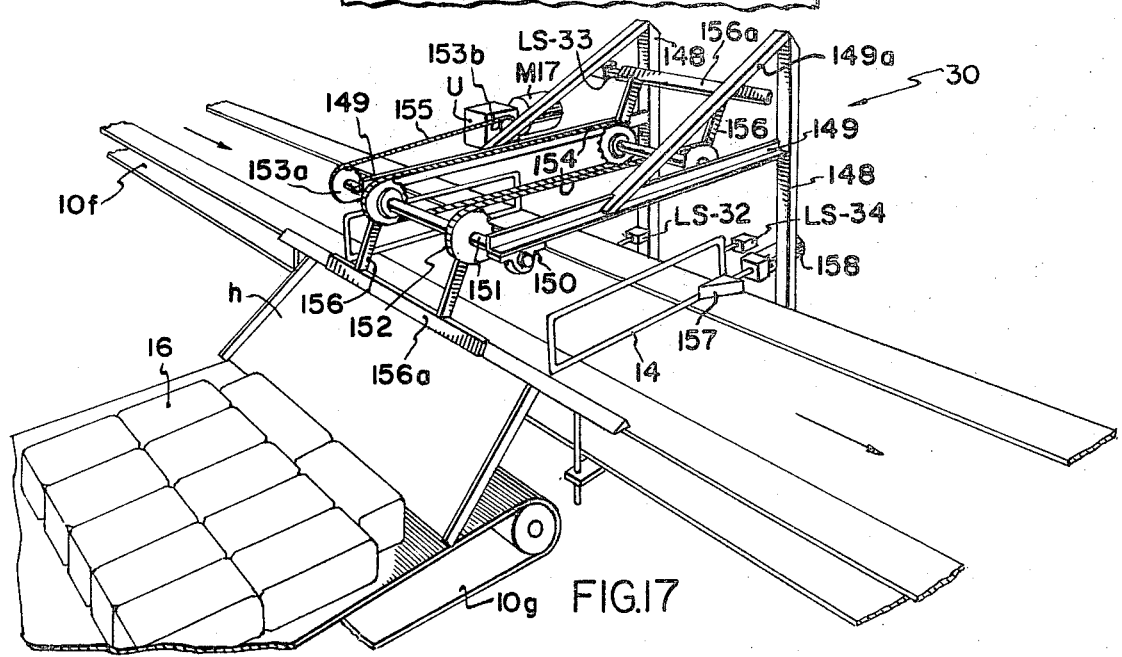
FIG. 17 is an enlarged perspective view illustrating apparatus for unloading food products from the trays downstream of the freezing chamber.

Connected in line L53, across the lines L1 and L2, are the normally open limit switch contacts LS–34c, which are closed when the tray 14 is in the unload position, illustrated in FIG. 17, actuating the tray sensing limit switch LS–34. The normally open limit switch contacts LS–32b, which close when product 16 is sensed in the tray 14, and the unloader sweep motor M17 for driving the product unloading sweep pusher 156a are also in line L53. Connected in line L54, between the unloader sweep motor M17 and the line L1, are the normally closed limit switch contacts LS–33c, which are opened when the unloader completes its sweep cycle and actuates the limit switch LS–33 (FIG. 17). Connected in line L55, across the lines L1 and L2, are the normally open limit switch contacts LS–35a of a limit switch LS–35 (FIG. 1A), adjacent the sanitizing tunnel 160 and the solenoid 160a, for causing the washer-dryer unit in the tunnel 160 to be operated for a predetermined time as the empty trays 14 are passing through the tunnel 160 on the conveyor 10.

THE OPERATION

Electrical power is connected to the circuit lines L1 and L2 (FIG. 18) to energize the conveyor drive motor M1 (line L3) and continuously drive the tray conveyors 10, 10a, 10d, and 10e, and the product supplying conveyor 12. The conveyors 10 and 12 will deliver empty spaced apart trays 14 and spaced apart grouped food products 16 into engagement with the stops 52 and 54, respectively. The discharge conveyor drive motor M16 (line L50) is also energized to drive the endless conveyor 10f until a loaded tray reaches the unloader 30.

It will be assumed that the conveyor bed frame 43 (FIGS. 5 - 9) is in the lowered position, illustrated in FIG. 5, and that the tray blocking gate 52 is initially in the lowered position, permitting an empty tray 14 to be moved onto the loader tray conveyor belts 50 which are being driven by the motor M2 (line L4). The tray conveyor belts 50 receive the empty tray 14 and move it to the proper longitudinal loading position at or near the center of tray conveyor T, illustrated in FIG. 6, to actuate the limit switch LS-1. When the limit switch LS-1 is actuated, the limit switch contacts LS-1a (line L4) open to deenergize the loader tray conveyor drive motor M2 and thus interrupt movement of the tray conveyor belts 50. The limit switch contacts LS-1b (line L6) also close to energize the loader bed raise solenoid 45a to cause the cylinder 45 (FIGS. 5-9) to move the conveyor bed frame 43 to the raised position, illustrated in FIG. 7. This moves the empty tray 14 and the tray thereon to a position slightly below the stops 66. When the limit switch contacts LS-1a (line L4) open, the tray gate lowering solenoid 52a (line L5) is also deenergized to permit the tray gate 52 to be spring returned to the blocking position, illustrated in FIG. 7, by the biasing spring 53d.

As the conveyor bed frame 43 is raised to the position illustrated in FIG. 7, the limit switch LS-4 (FIGS. 5-9) is actuated to close the contacts LS-4a (line L7) and energize the product conveyor raising solenoid 62a (line L7). This causes the frame 43, the tray conveyor T and product conveyor P to be concurrently moved upwardly by cam 56. After the frame 43 is moved upwardly a slight distance, the tray 14 on conveyor T engages the stops 66 to interrupt upward movement of the tray conveyor T. The product conveyor P continues to move upwardly to the position illustrated in FIG. 8. The conveyor P actuates the limit switch LS-5, which closes the limit switch contacts LS-5a (line L8) to energize the roller driving motor M3, which drives the product support rollers 76 via belt 78. This also energizes the gate-lowering solenoid 54a (line L9) and lowers the product blocking gate 54 to permit food products 16 to be moved forwardly onto the then being driven rollers 76. The rollers 76 move the food products 16 to a position above the bottom of the tray 14 in which they actuate the limit switch LS-3.

When the product sensing limit switch LS-3 is actuated, the normally closed limit switch contacts LS-3b (line L7) open and deenergize the roller driving motor M3 (line L8). The normally open limit switch contacts LS-3c (line L10) simultaneously close to energize the productt conveyor lowering solenoid 62b causing the cylinder 62 to retract the cam 58 and permit the conveyor frame 43 and product conveyor P to be gravity lowered toward the positions illustrated in FIG. 8. During the initial downward movement of the product conveyor P, the torsion springs 77 maintain the tray 14 on the conveyor T against the stops 66. With continued downward movement of the frame 43, the tray conveyor T moves therewith to the position illustrated in FIG. 7. The product conveyor P is retracted through the tray grid bottom openings 35 to a level below the tray conveyor T so that the grid members 34 strip the products 16 from the rollers 76. The closing of contacts LS-3c (line L10) also energizes the product gate raising solenoid 54b (line L11) to return the product gate 54 to the raised position. This does not cause the tray gate 52 to be lowered because the limit switch contacts LS-2a (line L5) are opened by the conveyor frame 43 which is in the raised position actuating the limit switch LS-2. When the product sensing limit switch LS-3 is actuated, the contacts LS-3a (line L5) are also closed, to again energize the loader tray conveyor motor M2 (line L4), which drives the tray conveyor belts 50 to discharge the loaded tray 14 forwardly to the conveyor 10a. The loader cycle then repeats itself.

The loaded tray 14 is conveyed along the inclined portion 10b of the supply conveyor 10a to the stacker feed conveyor 86 (FIGS. 1A and 10). It actuates the limit switch LS-6 (FIG. 10), which closes the contacts LS-6a (line 13) and energizes the stacker sweep motor M14 which drives the sweep 89 to sweep the loaded tray 14 into the stacker 22. The stacker infeed sweep motor M4 will be energized throughout its sweep cycle via the closed limit switch contacts LS-7a (line L14) to deposit a loaded tray 14 on the stack supporting flights 85. When one of the pusher bars 95 reaches "home" position, the contacts LS-7a will again open.

The movement of the loaded tray 14 into the stacker 22 will actuate the limit switch LS-8 to close the contacts LS-8a (line L15) and momentarily energize the stack lowering motor M5 which will cause the stacker lowerator to lower a distance corresponding to one tray height. When the next tray 14 is moved to the conveyor 86, the sweep 89 will again be energized to slide the following tray across to the top of the first tray. The stacker sweep motor M4 will continue to index the stacked trays downwardly until the predetermined stack height is reached, after which the cam operated switch SC-1 (line L16) is closed. This will cause the stacker lowerator motor M4 (line L13) to be driven to finish the stacking cycle, depositing the stack S on the discharge conveyor 10c. When a stack S is deposited on the discharge conveyor 10c, the limit switch LS-9 is actuated to close the contacts LS-9a (line L17) and energize the stacker discharge conveyor motor M6 which drives the conveyor 10c to move the stack S forwardly until the stack clears the stacker 22 and the limit switch LS-9 is deactuated.

When a stack S is discharged from the discharge end of the discharge conveyor 10c, the limit switch LS-15 is actuated to close the contacts LS-15a (line L19) and energize the vestibule door opening solenoid 110a and freezer door closing solenoid 107a, which causes the vestibule inlet doors 110 to open and the freezer inlet doors 107, respectively, to close.

The stacker cycle will continue to repeat itself until a sufficient number of stacks S are on the discharge conveyors 10c and 10c' to actuate a limit switch LS-10 at the discharge end of the stacker discharge conveyor 10c' to open the contacts LS-10a (line L17). Thereafter, the discharge conveyors 10c and 10c' will only operate when a stack S is on the conveyor 10c actuating the limit switch LS-9 to close the contacts LS-9a (line L17), the entry patrolling pallet 120 does not have a stack supported thereon actuating the limit switch LS-11 (so that the contacts LS-11a (line L18) remain closed), and the patrolling pallet 120 is in alignment with the second freezer conveyor 114a and the freezer inlet opening 105 to actuate the limit switch LS–13 and close the contacts LS–13a in line L18. When these conditions exist, the stack S on the conveyor 10c' is discharged to the freezer room 26. As the stack S is moving off the conveyor 10c' toward the freezer room 26, the limit switch LS–16 is actuated to close the normally open contacts LS–16a (line L21) and energize the vestibule door closing solenoid 110b and freezer door opening solenoid 107b which causes the vestibule inlet doors 110 to close and the freezer inlet doors 107 to open. This permits the stack S to be moved through the vestibule 24 into the freezing chamber 26 with a minimum of moisture passing into the freezing chamber 26.

When the entry patrolling pallet 120 is in alignment with the second freezer conveyor 114a and the freezer inlet 105, the limit switch LS–13 is actuated to close the contacts LS–13b (line L22) so that the entry patrolling pallet conveyor motor M7 is energized. This will drive the patrolling pallet transfer conveyor chains 128 to permit a stack S to be delivered thereto. When a stack S is positioned on the chains 128, the limit switch LS–11 is actuated to open the normally closed contacts LS–11b (line L22) and deenergize the transfer conveyor motor M7. At the same time, the normally closed limit switch contacts LS–11a (line L18) are opened to energize the stacker discharge conveyer motor M6. This prevents the operation of conveyors 10c and 10c' to halt the further supply of stacks S to the freezing unit 26.

If the second freezing conveyor 114a is selected to be supplied with stacks S, the lane selector switch 167 would be in the second position so that the contacts 167a–167e would be in the position, illustrated in FIG. 18. The limit switch LS–11 would be actuated to close the contacts LS–11c (line L23) so that the transfer conveyor motor M7 is energized through circuit line L24 to discharge a stack S from the chains 128 to the second freezer conveyor 114a. At this time the second freezer conveyor drive motor M10 (line L31) would be energized through the limit switch contacts LS–18a (line 31), which close when the stack S is being discharged from the patrolling pallet 120.

If the first freezer conveyor 114 had been selected for loading, the selector switch 167 would be positioned so that the contacts 167a (line L23) and 167d (line L26) would be closed and the contacts 167b (line L24), 167c (line L25) and 167e (line L28) would be open. When the selector switch contacts 167d (line L26) close, the advance armature M8a (line L26) is energized to move the patrolling pallet 120 transversely until it actuates the limit switch LS–12 adjacent the supply end 111 of the freezer conveyor 114 and the patrolling pallet 120 is aligned with the first freezer conveyor 114 to open the contacts LS–12b (line L26). This deenergizes the advance armature M8a. When the limit switch LS–12 is actuated, the limit switch contacts LS–12a (line L23) are closed to energize the transfer conveyor motor M7 which drives the transfer feed conveyor chains 128 to discharge the stack S from the patrolling pallet 120 to the first transfer conveyor 114. When the stack S on the patrolling pallet 120 is moved forwardly, the limit switch LS–17 is actuated by the stack to close the contacts LS–17a (line L30) and energize the freezer conveyor drive motor M9 for driving the first freezer conveyor 114 to cause it to receive the stack. The freezer conveyor motor M9 continues to run until the delivered stack clears the limit switch LS–17 indicating that the stack S is fully loaded on the first freezer conveyor 114. As the stack S clears the limit switch LS–11 adjacent the patrolling pallet transfer conveyor chains 128, the contacts LS–11d (line L27) close to energize the return armature M8b for returning the patrolling pallet 120 to a position in alignment with the freezer inlet 105 and the freezer conveyor 114a, in position to receive another stack.

If the third freezer conveyor 114b had been selected for loading, the switch 167 would be positioned so that the contacts 167c (line L25) and 167e (line L28) are closed and the contacts 167a (line L23), 167b (line L24) and 167d (line L26) are open. The closed contacts 167e (line L28) will energize the reverse winding M8b, via line L28, to move the patrolling pallet 120 transversely until it is aligned with the supply end 111 of the freezer conveyor 114b. This actuates the limit switch LS–14 and opens the contacts LS–14b (line L28) to deenergize the patrolling pallet transfer armature M8b. When the limit switch LS–14 is actuated, the limit switch contacts LS–14a (line L25) close to energize the transfer conveyor discharge motor M7 (line L22), driving the transfer chains 128 so as to discharge a stack S to the freezer conveyor 114b. As the stack S moves off the chains 128, the limit switch LS–19 is actuated to close the contacts LS–19a (line L31) so as to energize the freezer conveyor drive motor M11 for driving the freezer conveyor 114b so that it will receive the stack S. When the stack S is removed from the patrolling pallet chains 128, the limit switch LS–11 is deactuated closing the contacts LS–11f (line L28a) to energize the transfer motor winding M8a which transversely moves the patrolling pallet 120 to its starting position aligned with the freezer inlet 105.

When one of the freezer conveyors, for example freezer conveyor 114, is fully loaded, the limit switch LS–20 at the discharge end of conveyor 114 will be actuated to open the contacts LS–20a (line L23) to prevent the motor M7 on the patrolling pallet 120 from being energized and thus preclude further loading of the first conveyor 114. When the second conveyor 114a is full, the contacts LS–21a (line L24) open to prevent operation of the patrolling pallet discharge motor M7 and interrupt loading of the second conveyor 114a. When the third conveyor 114b is full, the contacts LS–22a (line L25) open to prevent operation of the patrolling pallet discharge motor M7 and interrupt loading of the third freezer conveyor 114b. When one of the conveyors 114, 114a and 114b is full, a new selection for loading must be made. It should be understood that the remaining freezer conveyors 114c, 114d and 114e are loaded in a similar manner. One extra bed beyond production requirement may be provided so that the operator can fill one row while discharging another.

When the stacks S have been stored on the freezer conveyors 114a and 114b for a sufficient length of time to adequately freeze the stacked products, the unload selector switch 168 is selectively positioned to unload the desired product from any selected freezer conveyor. If, for example, the first freezer conveyor 114 had been selected for unloading, the selector switch 168 would be moved to the position in which the contacts 168a (line L36) and 168c (line L41) are closed and all of the remaining contacts 168b (line L39), 168d (line L42) and 168e (line L43) are open.

When the selector switch contacts 168a (line L36) are closed, the discharge patrolling pallet lateral transfer motor winding M12a (line L35) is energized to move the discharge patrolling pallet 120' into alignment with the discharge end 113 of the first freezer conveyor 114. When the patrolling pallet 120' reaches the discharge position adjacent the discharge end of the first conveyor 114, the limit switch LS–24 is actuated to open the contacts LS–24b (line L35) deenergizing the transfer motor winding M12a.

The first freezer conveyor drive motor M9 will be energized to discharge a stack S to the patrolling pallet 120' when the limit switch contacts LS–24a (line L32) are closed. The limit switch LS–20 at the discharge end of the freezer conveyor 114 will be actuated, indicating that the first freezer conveyor 114 is full. When switch LS–20 is actuated, the contacts LS–20b (line L39) are closed. The contacts LS–24c (line L39) close when the patrolling pallet 120' is at the first freezer conveyor 114 to energize the discharge transfer feed conveyor motor M13 which will drive the patrolling pallet stack supporting chains 128' to receive a stack discharged by the first freezer conveyor 114.

If the second freezer conveyor 114a had been selected for loading, the selector switch contacts 168d are closed and the remaining selector switch contacts 168a, 168b, 168c, and 168e are open so that neither of the lateral carriage moving windings M12a (line L35) or M12b (line L36) is energized and the patrolling pallet 120' remains aligned with the second freezer conveyor 114a. The switches LS–21b and LS25d (line L40) will both be closed to energize the motor M13 (line L39) for driving the chains 128' on the patrolling pallet 120'. In this instance, the patrolling pallet 120' does not move after being loaded and the motor M13 continues to be energized via the now closed contacts LS–25e and LS–23g in line L42.

If the third conveyor lane 114b had been selected for unloading, the operation is similar except that the selector switch contacts 168a, 168d remain open and the selector switch contacts 168b and 168e are closed. This initially energizes the winding M12b (line L36) to move the patrolling pallet into alignment with the discharge end of the conveyor 114b. The contacts LS-22b and LS–26e (line L41) close to energize the motor M13 (line L39). The winding M12a (line L35) is then energized via line L38 to return the patrolling pallet to the discharging position. The motor M13 is again energized via line L42 to discharge the pallet through the freezer outlet.

When a stack S has been transferred to the discharge transfer conveyor chains 128', the limit switch LS–23 is actuated to close the normally open contacts LS–23c (line L36) and energize the return armature M12b (line L36). This returns the patrolling pallet 120' to the position in alignment with the freezer outlet 106. When the patrolling pallet 120' reaches this position, the limit switch LS–25 is actuated to open the normally closed contacts LS–25b (line L36) and deenergize the carriage motor lateral transfer armature M12b. At this time, the normally open limit switch contacts LS–25e (line L42) will also close. The contacts LS–23g (line L42) will have been closed when a stack S is transferred to the patrolling pallet. The transfer feed conveyor motor M13 (line L39) will thus be energized, via circuit line L42, to discharge the stack S from the patrolling pallet 120' to the conveyor 10d, which moves the stack off the patrolling pallet 120' to the unstacker 28.

When the stack S, on the patrolling pallet 120', is initially moved toward the unstacker 28, the limit switch LS–28 is actuated to close the contacts LS–28a (line L42) to energize the freezer door opening solenoid 108a (line L43) and open the freezer outlet doors 108, and energize the vestibule gate closing solenoid 142a (line L44) to close the vestibule doors 142. When the stack S has been moved into the vestibule 27, the limit switch LS–29 is actuated to close the contacts LS–29a (line L45) to energize the freezer discharge door closing solenoid 108b to close the freezer doors 108 and energize the vestibule door opening solenoid 142b which causes the vestibule doors 142 to open and permit the stack S to be moved into the unstacker 28.

When the stack S is moved to the unstacker 28, the stack sensing limit switch LS–27 (FIG. 16) is actuated to close the contacts LS–27b (line L47) and the unstacker elevator drive motor M14 is energized to cause the unstacker flights 85' to index the stack S upwardly. As the stack S is raised so that the uppermost tray is in position to be unstacked, the limit switch LS–30 (FIG. 16) is actuated to close the contacts LS–30b (line L48) which energizes the sweep motor M15 (line L48) to drive the sweep 89' which sweeps the uppermost tray from the stack S. The limit switch LS–30 is intermittently actuated to intermittently energize the sweep motor M15 until the entire stack is unstacked. As the trays 14 are unstacked, and moved onto the tilt tray 145, the tilt tray 145 will swing about its support rod 145a and discharge the tray 14 to the chute 146. When the tray 14 slides off the tilt tray 145, the tilt tray 145 is spring returned to its original position.

The destacked tray 14 is moved to the unloader 30, where it is interrupted by the stop 157. The tray sensing and product sensing limit switches LS–34 and LS–32 are actuated to open the contacts LS–34a (line L51) and contacts LS–32a (line L50) to deenergize the motor M16 for driving the conveyor 10f. The contacts LS–34c (line L51) and LS–32b (line L53) also close to cause the unloader sweep motor M17 (line L53) to be energized to move the sweep bar 156a and push the products 16 from the tray 14. After the tray 14 is unloaded, the limit switch LS–33 is actuated to close the contacts LS–33b. This energizes the solenoid 158a (line L52) to retract the tray stop 157. This also causes the contacts LS–33a (line L50) to close and energize the unloader conveyor drive motor M6 which drives the conveyor 10f to move the unloaded tray 14 to the conveyor 10. The trays 14 are moved by the conveyor 10 to the sanitizing unit 160 where the limit switch LS–35 is actuated to close the contacts LS–35a (line L55) which activate the conventional washer spray unit 162 and blower drier unit 163 and cause the tray to be washed and dried as it is returning to the conveyor 10 for recycling.

A typical system having a freezing temperature within the chamber 26 of −40° F. will freeze 5 tons of product per hour with a four-hour retention period. The tray construction including the complementally fitting slide rails and lip arrangement assures positive vertical stacks. The open ends of the trays are important to permit the described loading and unloading of the product.

It is to be understood that the drawings and descriptive matter are in all cases to be interpreted as merely illustrative of the principles of the invention, rather than as limiting the same in any way, since it contemplated that various changes may be made in various elements to achieve like results without departing from the spirit of the invention or the scope of the appended claims.

What is claimed is:

1. A system for treating food products comprising:
a plurality of individual, product carrier grid means for supporting products to be treated;
food product treating means including:
a food treatment enclosure having an inlet port, a food treating station, and a discharge port;
conveying means within said enclosure for receiving said product carrier means and conveying said product carrier means in a direction away from said inlet port toward said discharge port through said food treating station; and
means for effecting the treatment, of food product on said conveying means at said food treating station;
transport means upstream of said conveying means for supplying said carrier means to and through said inlet port to said conveying means comprising:

loading means for cyclically supplying product to said individual carrier means;
means for vertically stacking a plurality of the product carrying means in individual stacks upstream of the treating station; and
means for delivering the stacks of carrier means to said conveying means;
discharging means downstream of said conveying means for receiving said stacks of carrier means and treated product from said conveying means;
means for unstacking said stacks of carrier means downstream from the treating station;
unloading means, downstream of said unstacking means, for unloading the treated product from the unstacked product carrier means;
means by which the unloaded product carrier means are returned to said supply conveying means; and electrical control circuit means, adapted to be connected to a source of electrical power, for operating said transport means, said conveying means, and said discharging means in coordination.

2. The system of claim 1 wherein said transport means handles products in a continuous stream and said means by which said carriers are returned comprises a conveyor completing the circuit to said loading means.

3. The production system of claim 2 wherein said transport means comprises:
supply conveyor means for conveying carrier means to said stacking means;
said product supplying loading means comprises means for supplying product to said carrier means upstream of said stacking means;
said stacking means being positioned at said inlet port and including means for conveying stacks of carrier means to said inlet port;
said unstacking means being positioned at said discharge port and including means for conveying stacks of carrier means away from said discharge port and sequentially unstacking said carrier means;

said product unloading means including discharge conveying means for receiving the carrier means from said unstacking means and moving them in a downstream path of travel to said return conveying means;
said unloading means comprising means for removing treated product from the carrier means downstream of the unstacking means.

4. The production system of claim 1 wherein said conveying means within said enclosure includes:
a plurality of side-by-side individually operable, conveyors each having an inlet end and a discharge end;
inlet transfer conveyor means within said enclosure for receiving stacks of carrier means at said inlet port and conveying them to the inlet end of any selected one of said side-by-side conveyors;
discharge transfer conveyor means for receiving stacks of carrier means at the discharge end of any selected one of said side-by-side conveyors and conveying them to said discharge port;
said control circuit means including means settable to determine which of said side-by-side conveyor stacks are to be delivered to and discharged from.

5. The production system of claim 4 wherein said inlet transfer conveyor means comprises:
a laterally movable inlet carriage;
a longitudinally traveling inlet conveyor on said carriage;
means connected in said control circuit means for laterally moving said inlet carriage between a stack receiving position in which said inlet traveling conveyor is aligned with said inlet port and any one of a plurality of discharge positions in which said inlet traveling conveyor is aligned with the inlet end of any of the side-by-side conveyors; and
means connected in said control circuit means for operating said traveling conveyor in said receiving position to receive stacks from said supplying means at said inlet port and
for operating said inlet traveling conveyor to discharge stacks to said side-by-side conveyors in said discharge positions;
said outlet transfer conveyor means comprising:
a laterally movable outlet carriage;
a longitudinally traveling outlet conveyor on said carriage;
means connected in said control circuit means for laterally moving said outlet carriage between any one of a plurality of stack-receiving positions in which said traveling outlet conveyor is aligned with the discharge ends of said side-by-side conveyors and a discharge position in which said traveling outlet conveyor is aligned with said outlet port; and
means connected in said control circuit means for operating said outlet traveling conveyor in said receiving positions to receive stacks from said side-by-side conveyors, and for operating said outlet traveling conveyor in said discharge position to discharge stacks to said outlet port.

6. The production system of claim 5 including means sensing the presence of said inlet carriage in said receiving position;
said supplying means including transporting conveyor means for transporting stacks from said stacking means to said traveling inlet conveyor when said inlet carriage is in said receiving position; and means for rendering said transporting carriage means inoperable when said inlet carriage is not in said receiving position.

7. The production system of claim 6 including proximity sensing means sensing the presence of a stack on said traveling inlet conveyor, and means responsive to said proximity sensing means for rendering said transporting carriage means inoperative when a stack is on said traveling inlet conveyor.

8. The system of claim 1 wherein said conveying means within said enclosure comprises:

means for receiving stacks of product supporting carrier means from said supply means and conveying said stacks from said inlet port to said discharge port in any one of a plurality of parallel paths of travel including:

a plurality of individually operable conveyors in said treatment enclosure, each of said conveyors including an inlet end and a discharge end; and means connected in said control circuit means for individually operating any selected one of said conveyors.

9. The system of claim 8 including means for sensing the presence of a stack in said inlet port; means responsive to said sensing means for rendering said supply means inoperative to supply trays when a stack of trays block said inlet port; and means is connected in said control circuit means for operating said unstacking means when a stack is delivered thereto.

10. The system of claim 9 further including additional sensing means for sensing the presence of a full complement of stacks on each of said conveyors; and means, responsive to said additional sensing means, precluding the supply of stacks to any conveyor having a full complement of stacks which is not being discharged.

11. The system set forth in claim 1 further including means connected in circuit with said control circuit means for rendering said supplying means inoperative to supply a stack of carrier means to said treating means when a stack of said carrier means is positioned at said inlet port blocking the further passage of stacks; and means connected in circuit with said circuit means for operating said unstacking means in response to a stack being delivered thereto to unstack said delivered stack.

12. The apparatus of claim 11 wherein said carrier means comprises product supporting trays and said means for supplying product comprises:

longitudinally extending tray conveying means including a movable portion having a tray supporting surface for supporting said tray at a loading station and conveying it sway therefrom in a forward path of travel after it is loaded with product;

product conveying means, including a movable portion having a product supporting surface within the longitudinal extent of the movable portion of said tray conveying means, for conveying product in a path of travel to said loading station;

means mounting said tray conveying means and product conveying means on said frame support means for relative vertical movement between first and second positions in which said product support surface is above and below, respectively, said tray support surface and the bottom wall of a tray at said loading station;

means for relatively moving at least one of said tray conveying means and product conveying means relative to the other to said first position to permit product to be moved to said loading station superposed with a tray positioned thereat and for relatively moving said tray conveying means and said product conveying means to said second position to deposit the product moved to said loading station on the bottom wall of said tray; and means for operating said movable portion of said tray conveying means to move said tray and product thereon in said forward path of travel.

13. A treating system for treating a run of food product comprising:

a plurality of individual, stackable product carrier means for supporting product;

control circuit means adapted to be connected to a source of power;

means connected in said control circuit means for loading product on said product carrier means;

stacking means connected in said control circuit means for receiving product supporting carrier means from said loading means and stacking them in individual stacks;

means for sequentially receiving said stacks from said stacking means and treating the product supported thereon comprising:

a plurality of individually movable, side-by-side, elongate conveyor beds at a treating station downstream from said stacking means for receiving a plurality of stacks and moving said stacks of product in a plurality of downstream paths of travel;

means for directing the stacks to any selected one of said plurality of side-by-side conveyor beds;

means connected in said control circuit means for moving stacks along any selected one of said conveyor beds to move stacks therealong;

means connected in said control circuit means for preventing the delivery of said stacks of carrier means to any one of said conveyor beds when a predetermined number of stacks are supported by said one bed; and means for treating the product on the conveyor beds at said treating station;

means connected in said control circuit means for moving stacks from any selected one of said conveyor beds to discharge the stacks from said conveyors in any selected order;

means for receiving the discharged stacks and sequentially, individually unstacking the product supporting carrier means;

means connected in said control circuit means for receiving the product carrier means from the unstacking means; and means connected in said control circuit means for removing the product from the carrier means downstream of the unstacking means to permit the carrier means to be returned to the product loader means.

14. Apparatus for treating a product comprising:

a treatment enclosure having inlet and outlet openings;

a plurality of individually operable conveyors in said enclosure;

openable and closeable inlet and outlet door means for selectively opening and closing said inlet and outlet openings;

first conveying means for delivering product to said enclosure through said inlet opening including:

means for stacking product in individual stacks;

first vestibule means having an inlet opening and an outlet opening communicating with the inlet opening of said treatment enclosure;

transporting means for transporting stacks of product from said stacking means through said first vestibule means to any selected one of said conveyors in said treatment enclosure;

inlet door means for selectively closing the inlet opening on said first vestibule means;

control circuit means adapted to be connected in circuit with a source of electrical power;

means connected in said control circuit means for opening the inlet door means of said first vestibule means while closing the inlet door means of said treatment enclosure to admit a stack of product on said transporting means to said first vestibule means and then closing the inlet door means of said first vestibule means and opening the inlet door means to said treatment enclosure to admit the stack on said transporting means in said first vestibule means to said enclosure while minimizing the passage of air to said treatment enclosure;

means connected in said control circuit for operating any selected one of said conveyors to move said stacked product received from said transporting means toward said outlet opening in said treatment enclosure;

second vestibule means having an outlet opening and an inlet opening communicating with the treatment enclosure outlet opening;

outlet door means for selectively opening and closing said vestibule outlet opening;

discharge conveying means for receiving a stack of products from any selected one of said conveyors and conveying it through said second vestibule means;

means for opening the outlet door means of said treatment enclosure and closing the outlet door means of said second vestibule means to permit a stack of products on said discharge conveying means to move to said second vestibule means and for then closing said outlet door means on said treatment enclosure and opening the outlet door means on said second vestibule means to permit a stack of products on said discharge conveying means to move outwardly while minimizing the passage of air to said enclosure to minimize moisture accumulation therein.

15. Apparatus for loading food products into a tray having a bottom wall with at least one opening therethrough comprising:

frame support means;

longitudinally extending tray conveying means, having a tray supporting surface for supporting said tray at a loading station, for conveying an empty tray to said loading station and moving it away therefrom in a forward path of travel after it has been loaded with food products;

product conveying means, within the longitudinal extent of said tray conveying means, including a movable portion generally in vertical alignment with the opening in a tray positioned at the loading station and having a product supporting surface for conveying product in a path of travel to said loading station;

means mounting said tray conveying means and said product conveying means on said frame support means for relative vertical movement between first and second positions in which said product support surface is above and below, respectively, said tray support surface and the bottom wall of a tray at said loading station, said movable portion of said product conveying means passing through said opening when said tray conveying means and product conveying means are relatively moved to said second positions;

means for relatively moving said tray conveying means and product conveying means to said first positions to permit product to be moved to said loading station superposed with the bottom wall of a tray positioned at said loading station and for relatively moving said tray conveying means and said product conveying means to said second positions to deposit the product moved to said loading station on the bottom wall of said tray; and means for operating said tray conveying means to move said tray and product thereon in said forward path of travel.

16. A system for treating food product comprising:

a treatment enclosure having an inlet port and an outlet port;

product supply means including means for stacking said product in stacks and sequentially delivering said stacks to said inlet port;

a plurality of side-by-side conveying means, each having an inlet end and an outlet end, within said enclosure;

control circuit means adapted to be connected to a source of electrical power;

inlet carriage means, including inlet transfer means, in said enclosure, laterally movable between a first position in which said inlet transfer means is aligned with said inlet port for receiving a stack of product and any selected one of a plurality of discharge positions, in which said inlet transfer means is aligned with the inlet end of any selected one of said conveying means;

drive means for operating said inlet transfer means when said carriage means is in said first position to receive a stack of products and for operating said inlet transfer means when said carriage means is in a discharge position to discharge a stack to said conveying means;

motor means connected in circuit with said control circuit means for individually operating any selected one of said conveying means when a stack is delivered thereto;

means connected in circuit with said control circuit means for operating said inlet carriage means to move said inlet carriage means between said first position and said discharge positions;

means in said enclosure for treating products on said side-by-side conveying means;

additional carriage means, including outlet transfer means, in said enclosure, laterally movable between a stack discharging position in which said outlet transfer means is aligned with said outlet port, and any one of a plurality of stack receiving positions in which said outlet transfer means is aligned with the discharge end of any selected one of said side-by-side conveying means;

additional drive means for operating said outlet transfer means when said additional carriage means is in said stack receiving positions to receive a stack and for operating said outlet transfer means when said additional carriage means is in said discharge position to discahrge a stack through said outlet; and means connected in circuit with said control circuit means for operating said carriage means to move said additional transfer conveying means between said positions.

17. The system of claim 16 wherein said product supply means includes supply conveying means for conveying stacks to said carriage means at said inlet port; and means connected in circuit with said control circuit means and responsive to the presence of product on said inlet transfer means for precluding said supply conveying means from delivering products to said inlet transfer means.

18. The system of claim 6 including means connected in circuit with said control circuit means for precluding operation of said supply conveying means when said inlet transfer means is not at said inlet port.

19. A system for treating food products comprising:

a plurality of individual, product carrying grid carrier means supporting products to be treated;
product treating means including:
a treatment enclosure having an inlet port, a treating station, and a discharge port;
conveying means within said enclosure for receiving said product carrying grid means and conveying said product carrying grid means in a direction away from said inlet port toward said discharge port through said treating station; and
means for effecting the treatment of product on said conveying means at said treating station;
transport means upstream of said conveying means for supplying said carrier means to and through said inlet port to said conveying means comprising:

means for vertically stacking a plurality of the product carrying means in individual stacks; and means for delivering the stacks of carrier means to said conveying means;
discharging means downstream of said conveying means for receiving said stacks of carrier means and treated product from said conveying means;
means for unstacking said stacks of carrier means;

means by which the unloaded product carrier means are returned to said supply conveying means; and electrical control circuit means, adapted to be connected to a source of electrical power, for operating said transport means, conveyor means, and said discharging means in coordination.

20. A system for treating food products comprising: a supply conveying means; a plurality of product carrying grid carrier means, for supporting products to be treated, movable thereon; product treating means including: a treatment enclosure providing a treating station; a generally horizontal enclosure conveying means within said enclosure for receiving said product carrying grid means and conveying said product carrying grid means in a generally horizontal direction through said treating station; means for effecting the treatment of food product on said grid means at said treating station; product loading and unloading stations for said grid means; transport means upstream of said enclosure conveying means for receiving grid carrier means from said supply conveying means and supplying said grid carrier means to said enclosure conveying means including stacking means for vertically stacking a plurality of the product carrying grid means in individual stacks; discharging means, which includes means for unstacking said stacks of carrier means, provided downstream of said enclosure conveying means for receiving said stacks of carrier means from said enclosure conveying means; and control circuit means for operating said transport means, enclosure conveyor means, and said discharging means in coordination to deliver grid carrier stacks of untreated food products to the product treatment enclosure conveying means and to remove grid carrier stacks of treated food product therefrom.

* * * * *